(12) United States Patent
Hansson

(10) Patent No.: US 11,981,071 B2
(45) Date of Patent: May 14, 2024

(54) ADJUSTABLE GUIDE SYSTEMS

(71) Applicant: ARCAM AB, Mölnlycke (SE)

(72) Inventor: Karl Hansson, Molnlycke (SE)

(73) Assignee: Arcam AB, Mölnlycke (SE)

( * ) Notice: Subject to any disclaimer, the term of this patent is extended or adjusted under 35 U.S.C. 154(b) by 378 days.

(21) Appl. No.: 17/127,124

(22) Filed: Dec. 18, 2020

(65) Prior Publication Data

US 2022/0193991 A1 Jun. 23, 2022

(51) Int. Cl.
*B29C 64/00* (2017.01)
*B22F 12/33* (2021.01)
*B29C 64/153* (2017.01)
*B29C 64/393* (2017.01)
*B33Y 30/00* (2015.01)

(52) U.S. Cl.
CPC ............ *B29C 64/153* (2017.08); *B22F 12/33* (2021.01); *B29C 64/393* (2017.08); *B33Y 30/00* (2014.12); *B22F 2999/00* (2013.01)

(58) Field of Classification Search
CPC .............................. B29C 64/153; B33Y 30/00
See application file for complete search history.

(56) References Cited

U.S. PATENT DOCUMENTS

| | | | |
|---|---|---|---|
| 7,585,450 | B2 | 9/2009 | Wahlstrom et al. |
| 10,569,364 | B2 | 2/2020 | Shi et al. |
| 2017/0203485 | A1* | 7/2017 | Sung .................. B29C 64/106 |
| 2019/0118482 | A1 | 4/2019 | Braunroth |

FOREIGN PATENT DOCUMENTS

| | | |
|---|---|---|
| CN | 107824788 A | 3/2018 |
| CN | 106475562 B | 5/2018 |
| CN | 109202078 B | 2/2020 |
| EP | 3219412 A1 | 9/2017 |
| EP | 3565708 A2 | 11/2019 |
| EP | 3628422 A1 | 4/2020 |

OTHER PUBLICATIONS https://www.youtube.com/watch?v=g_qUmoQHkAs (Year: 2016).*
https://web.archive.org/web/20191128090953/https://www.spitstec.nl/colorpod/ (Year: 2016).*
https://3dprint.com/125361/colorpod-full-color-converter/ (Year: 2016).*
https://hackaday.com/2012/07/13/3d-printing-with-a-delta-robot-that-seems-to-simplify-the-concept/ (Year: 2012).*

* cited by examiner

*Primary Examiner* — Nicholas R Krasnow
(74) *Attorney, Agent, or Firm* — Dinsmore & Shohl LLP

(57) ABSTRACT

Adjustable guide systems and additive manufacturing systems incorporating the same are disclosed. An adjustable guide system includes a first arm support coupled to a first end of a powder distributor in an additive manufacturing system, a second arm support coupled to a second end of the powder distributor opposite the first end, a plurality of shuttles, and a plurality of guide rails. Each one of the plurality of shuttles is pivotally coupled to the first arm support or the second arm support via one or more link arms. Each one of the plurality of guide rails supports a corresponding one of the plurality of shuttles thereon and allows each shuttle to move along the respective guide rail.

15 Claims, 13 Drawing Sheets

ADJUSTABLE GUIDE SYSTEMS

FIELD

The present disclosure relates to devices, systems, and methods for moving a raw material distributor, and more specifically, for moving a powder distributor in a plurality of planes in an additive manufacturing system.

BACKGROUND

Systems and components that are typically used to distribute a layer of material across a surface, such as a powder distributor over a build surface in an additive manufacturing system, typically use a rake guide system that typically includes a rake mechanism that extends across the surface. For example, in additive manufacturing systems, the rake mechanism may span between two rails disposed on the sides of a build platform and may slidably move along the two rails. Such a system only allows the rake mechanism to move in a single plane over the build platform (e.g., parallel to the build platform) to distribute material such as powder over the build platform. That is, movement of the powder distributor in such systems cannot be used to customize a distribution of the powder layer over the build platform, which limits the abilities of the additive manufacturing system in forming parts.

SUMMARY

In a first aspect, an adjustable guide system includes a first arm support coupled to a first end of a powder distributor in an additive manufacturing system, a second arm support coupled to a second end of the powder distributor opposite the first end, and a plurality of shuttles. Each one of the plurality of shuttles is pivotally coupled to the first arm support or the second arm support via one or more link arms. The adjustable guide system also includes a plurality of guide rails. Each one of the plurality of guide rails supports a corresponding one of the plurality of shuttles thereon and allows each shuttle to move along the respective guide rail.

In a second aspect, an additive manufacturing system includes a build platform and a powder distributor disposed adjacent to the build platform. The powder distributer includes a first end and a second end. The additive manufacturing system further includes an adjustable guide system that includes a first arm support coupled to the first end of the powder distributor, a second arm support coupled to the second end of the powder distributor opposite the first end, a plurality of shuttles, and a plurality of guide rails. Each one of the plurality of shuttles is pivotally coupled to the first arm support or the second arm support via one or more link arms. Each one of the plurality of guide rails supports a corresponding one of the plurality of shuttles thereon and allows each shuttle to move along the respective guide rail.

In a third aspect, an additive manufacturing system includes a build platform and a powder distributor disposed adjacent to the build platform. The powder distributor includes an arm having a first end and a second end. The additive manufacturing system further includes an adjustable guide system having a first arm support coupled to the first end of the arm of the powder distributor, a second arm support coupled to the second end of the arm of the powder distributor opposite the first end, a plurality of shuttles, a plurality of guide rails, a plurality of drive assemblies, and a controller communicatively coupled to the plurality of drive assemblies. Each one of the plurality of shuttles is pivotally coupled to the first arm support or the second arm support via one or more link arms. Each one of the plurality of guide rails supports a corresponding one of the plurality of shuttles thereon and allows each shuttle to move along the respective guide rail. Each one of the plurality of drive assemblies drives movement of a corresponding one of the plurality of shuttles along the respective guide rail. The controller directs movement of the plurality of drive assemblies.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure generally relates to adjustable guide systems that allow for a customized movement of a rake portion of a powder distributor in an additive manufacturing system. The adjustable guide systems described herein are generally sufficiently compact such that the adjustable guide systems can be fit within typical build tanks of additive manufacturing systems without further modification of the build tank, which also allows for retrofitting of existing build tanks. The adjustable guide systems described herein generally include four vertically disposed guide rails disposed within the build tank, each guide rail allowing movement of a shuttle (e.g., a linear actuator) along the length of the guide rail. The shuttles are coupled to two rake support structures via link arms at pivot points such that movement of the shuttles along the lengths of the guide rails cause a particular movement of the rake support structures. A rake is disposed between the rake support structures and includes a plurality of rake teeth for contacting and spreading material. The guide rails and the shuttles of the adjustable guide system can be located above or below a build platform, as described in greater detail hereinbelow.

While the present disclosure generally relates to the use of the adjustable guide systems in an additive manufacturing system, the present disclosure is not limited to such. The adjustable guide systems may also be used for other purposes and as a portion of other systems without departing from the present disclosure. For example, the adjustable guide systems described herein may be used with agricultural equipment (e.g., to spread soil, seeds, or the like), with construction equipment (e.g., to spread concrete, asphalt, or the like), other manufacturing equipment (e.g., equipment that does not include additive manufacturing), with healthcare equipment, with pharmaceutical manufacturing equipment, or the like. Other uses of the adjustable guide system should be apparent from the present disclosure.

Figure 1:
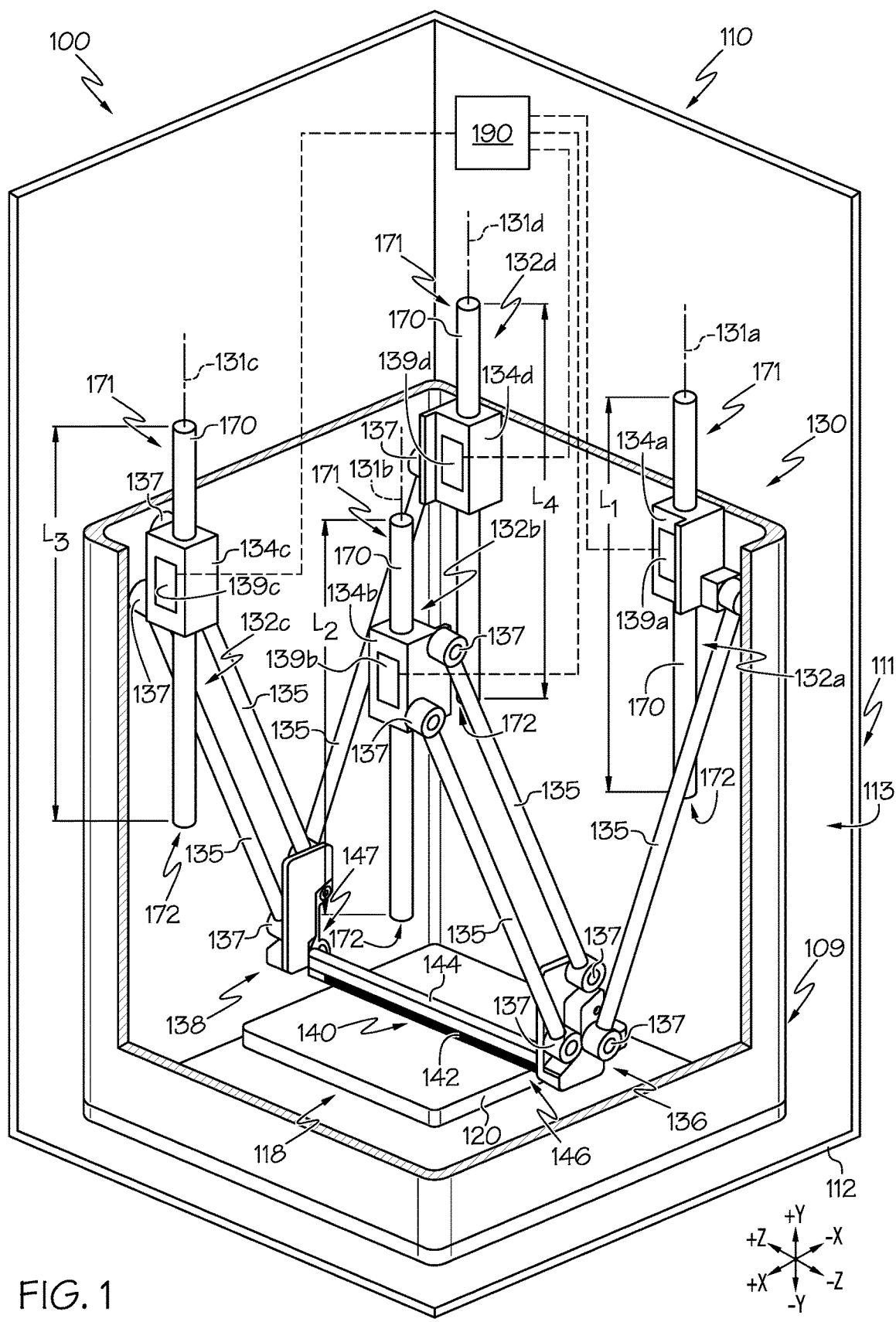
FIG. 1 depicts a perspective view of a build tank disposed within a build chamber of an additive manufacturing system having an illustrative adjustable guide system according to one or more embodiments shown and described herein.

One such particularly configured rake guide system within a build tank in a build chamber of an additive manufacturing system is depicted in FIG. 1, whereby the rake guide system is generally located above a non-moving build platform. That is, the rake guide system adjusts the height of the rake for each successive layer of powder that is distributed on the build platform, as described in greater detail herein. Various details regarding the features and components of the rake guide system for FIG. 1 are shown and described with respect to FIGS. 2A-2B, 3, and 4. Another particularly configured rake guide system within a build tank of an additive manufacturing system is depicted in FIG. 5, whereby the rake guide system is generally located below a movable build platform that moves downward after deposition of each successive layer of powder distributed thereon, as described in greater detail herein. Various details regarding the features and components of the rake guide system of FIG. 5 are shown and described with respect to FIGS. 6 and 7. FIGS. 8A-8C, 9, and 10 relate to movement of rake guide system, including the rake guide systems described with respect to FIGS. 1 and 5.

Electron-beam additive manufacturing, which may also be known as electron-beam melting (EBM), is a type of additive manufacturing (e.g., 3D printing) process that is typically used for metallic articles. EBM utilizes a raw material in the form of a metal powder or a metal wire, which is placed under a vacuum (e.g., within a vacuum sealed build chamber and/or build tank). Generally speaking, the raw material is fused together from heating via an electron beam.

The systems described herein that utilize EBM generally obtain data from a 3D computer-aided design (CAD) model and use the data to place successive layers of the raw material using an apparatus to spread the raw material, such as a powder distributor that includes a rake in some embodiments. The successive layers are melted together utilizing a plurality of electronically-controlled electron beams. As noted above, the process takes place under vacuum within a vacuum sealed build chamber and/or build tank, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation through solidification and solid-state phase transformation.

FIG. 1 depicts a perspective view of an illustrative build tank 109 within a build chamber 110 of an additive manufacturing system 100 that includes an adjustable guide system 130 disposed over a build platform 120 according to various embodiments. It should be appreciated that such an additive manufacturing system 100 may further include various other additive manufacturing components not depicted in FIG. 1, such as, for example, an electron beam (EB) gun, an imaging device, a sensing device, a powder hopper or other powder feed component, build platform movement components, and/or one or more control or analysis components. Such devices and components should generally be understood and are not described in greater detail herein.

The build tank 109 is generally disposed within a vacuum environment of the build chamber 110. That is, the build tank 109 is located within the build chamber 110 such that one or more chamber walls 112 of the build chamber 110 define an interior 113 in which the build tank 109 is disposed. The interior 113 containing the build tank 109 is separated from an exterior environment 111 via the one or more chamber walls 112. In some embodiments, the interior 113 of the build chamber 110 may be a vacuum sealed interior. However, it should be understood that in some embodiments, the build tank 109 and the build chamber 110 may be used interchangeably (e.g., a single space that contains the various components described herein). The vacuum environment established within the build chamber 110 may be such that an article formed within the build tank 109 is formed under optimal conditions for EBM, as is generally understood. The build chamber 110 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to one or more control components described hereinbelow such that the one or more control components direct operation of the vacuum system to maintain the vacuum within the interior 113 of the build chamber 110. In some embodiments, the vacuum system may maintain a base pressure of about $1 \times 10^{-5}$ mbar or less throughout an entire build cycle. In further embodiments, the vacuum system may provide a partial pressure of He to about $2 \times 10^{-3}$ mbar during a melting process. In other embodiments, the build tank 109 may be provided in an enclosable chamber provided with ambient air and atmosphere pressure. In yet other embodiments, the build tank 109 may be provided in open air.

The build tank 109 generally includes a build envelope 118 including the build platform 120 supporting a powder layer thereon (not shown), as well as a powder distributor 140 (e.g., a rake or the like) that is moved via the adjustable guide system 130. The build tank 109 may further include other components, particularly components that facilitate EBM, including components not specifically described herein.

The build envelope 118 is generally an area within the build tank 109 that includes a platform or receptacle that is arranged to receive raw material (e.g., material from one or more raw material hoppers, not shown) and/or support a workpiece thereon. The build envelope 118 is not limited in size or configuration by the present disclosure, but may generally be shaped and sized to hold an amount of the raw material in the form of a powder layer (not shown), one or more portions of article being formed, and/or unfused raw material, as described in greater detail herein.

As previously described hereinabove, the build platform 120 depicted in the embodiment of FIG. 1 is immovable and remains in the same location within the build envelope 118 throughout a build process. However, in other embodiments (e.g., the embodiment depicted in FIG. 5 for example), the build platform 120 may be supported by a lifting component to move in a system vertical direction (e.g., in the +y/−y directions of the coordinate axes depicted in FIGS. 1 and 5, for example).

Still referring to FIG. 1, the powder distributor 140 is generally arranged and configured to lay down and/or spread a layer of the raw material as a powder layer in the build envelope 118 (e.g., on start plate or the build platform 120 within the build envelope 118). That is, the powder distributor 140 is generally arranged to extend in a plane that is generally parallel to the plane in which the build platform 120 extends (e.g., a system horizontal plane defined by the x-axis and the z-axis of the coordinate axes depicted in FIG. 1). However, it will be apparent from the disclosure herein that the powder distributor 140 may be movable to extend in other directions. In some embodiments, the powder distributor 140 may be an arm, rod, or the like that extends a distance over or above the build envelope 118 (e.g., from a first end to a second end of the build envelope 118), such as over the build platform 120 in such a manner that allows the powder distributor 140 to move powder over the build platform 120 in a particular manner, as described herein. In some embodiments, the length of the powder distributor 140 may be longer than a width of the build platform 120 such that a powder layer on the build platform 120 can be distributed on each position of the build platform 120.

The powder distributor 140 may include an arm 144 that extends between and is coupled to a first arm support 136 and a second arm support 138 of the adjustable guide system 130. The arm 144 includes one or more teeth 142 (e.g., rake fingers or the like) that extend from the arm 144 into the raw material to cause disruption of the raw material when the powder distributor 140 moves (e.g., to distribute the raw material, to spread a powder layer, etc.). For example, the arm 144 may include a plurality of teeth 142 extending from a bottom surface of the arm 144 (e.g., extending generally towards the −y direction of the coordinate axes of FIG. 1).

In some embodiments, the teeth 142 may extend in a direction that is substantially perpendicular to a plane of the build platform 120 (e.g., perpendicular to the plane formed by the x-axis and z-axis of the coordinate axes depicted in FIG. 1). In another embodiment, the teeth 142 may be slanted with respect to the build platform 120. An angle of the slanted rake teeth with respect to a normal to the build platform may be any value, and in some embodiments is between about 0° and about 45° movement of the teeth 142 to achieve such a slanted angle will be described in greater detail herein. In some embodiments, each one of the plurality of teeth 142 may be a metal foil or a metal sheet. The total length of the plurality of teeth 142 may be longer than a width of the build platform 120 in order to make it possible to distribute powder on each position of the build platform 120. The teeth 142 may also be shaped and sized to rake through the raw material to distribute a powder layer on the build platform 120.

In some embodiments, a cross section of the arm 144 of the powder distributor 140 may be generally triangular. However, it should be understood that the cross section may be any shape, including but not limited to, circular, elliptical, quadratic, polygonal (e.g., rectangular), or the like. A height of the arm 144 of the powder distributor 140 may be set in order to give the powder distributor 140 a particular mechanical strength in the system vertical direction (e.g., along the +y/−y axis of the coordinate axes of FIG. 1). That is, in some embodiments, the arm 144 of the powder distributor 140 may have a particular controllable flex in the system vertical direction. The height of the arm 144 of the powder distributor 140 may also be selected taking into account that the powder distributor 140 pushes an amount of the raw material. If the height of the arm 144 of the powder distributor 140 is too small, the powder distributor 140 can only push forward a smaller amount relative to a higher power powder distributor 140. However, if the height of the arm 144 of the powder distributor 140 is too high, the powder distributor 140 may complicate the powder catching from a scree of powder, (e.g., the higher the height of the arm 144 of the powder distributor 140, the more force may be required in order to catch a predetermined amount of powder from the scree of powder by moving the powder distributor 140 into the scree of powder and letting a predetermined amount of powder fall over the top of the powder distributor 140 from a first side in the direction of travel into the scree of powder to a second side in the direction of the build platform 120). It should also be appreciated that due to the movement of the arm 144 of the powder distributor 140 by the adjustable guide system 130, particular heights of the arm 144 may not be important because the height can be adjusted accordingly by the adjustable guide system 130.

The adjustable guide system 130 includes a first arm support 136 and a second arm support 138 that are coupled to the ends (e.g., a first end 146 and a second end 147) of the arm 144 of the powder distributor 140. That is, the arm 144 of the powder distributor 140 extends between the first arm support 136 and the second arm support 138, the first end 146 of the arm 144 is coupled to the first arm support 136, and the second end 147 of the arm 144 is coupled to the second arm support 138 such that the arm supports 136, 138 hold the arm 144 of the powder distributor 140 and can move the arm 144 of the powder distributor 140 as described in greater detail herein.

Figure 2A:
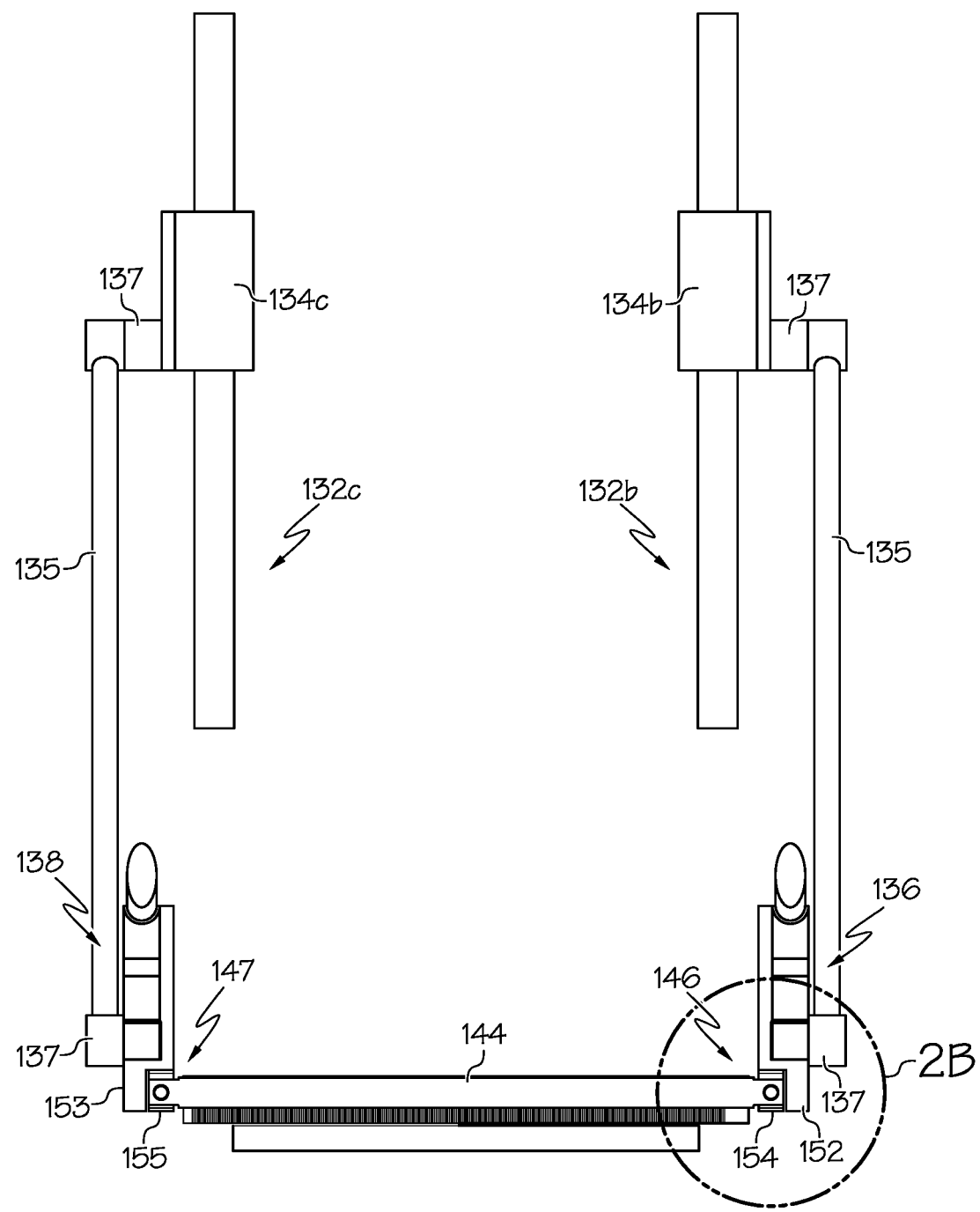
FIG. 2A depicts a front view of the adjustable guide system of FIG. 1.
Figure 2B:
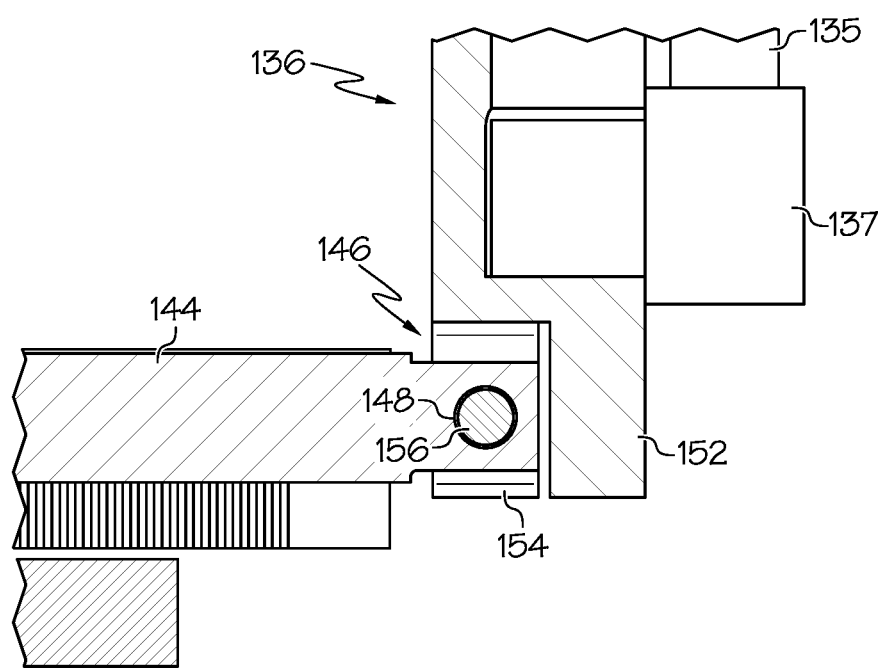
FIG. 2B depicts a detailed front view of a connection of an illustrative rake to an illustrative rake support structure in the adjustable guide system of FIG. 1.

Referring to FIGS. 1, 2A, and 2B, the first arm support 136 is shown coupled to the first end 146 of the arm 144 by one or more fasteners 156, such as screws, bolts, rivets, or the like disposed within a bore 148 of the rake arm body 144. The first arm support 136 includes a coupling member 154 coupled to the first end 146 of the rake arm body 144 by the fasteners 156, and a receiving member 152 extending from the coupling member 154. The receiving member 152 and the coupling member 154 may be a one piece, monolithic structure in some embodiments. While FIG. 2B specifically depicts the various components of the first arm support 136, it should be understood that similar components are used to couple the second arm support 138 to the rake arm body 144 in a similar manner (e.g., receiving member 153 and coupling member 155 of the second end 147 of the rake arm body 144 depicted in FIG. 2A).

Figure 3:
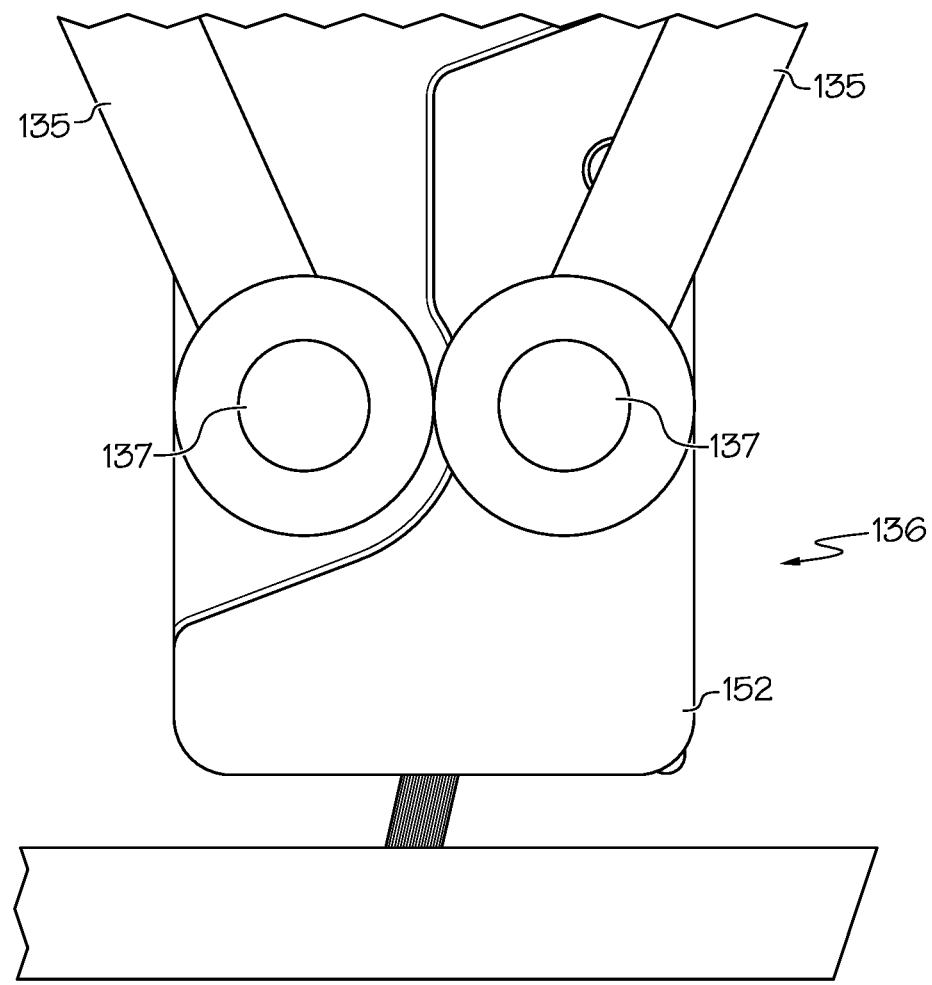
FIG. 3 depicts a side view of the rake and the rake support structure depicted in FIG. 2B.

Still referring to FIGS. 1, 2A, and 2B, the receiving member 152 of the first arm support 136 and the receiving member 153 of the second arm support 138 each have a surface or the like for receiving pivot points 137 coupled to link arms 135. More specifically, as shown in FIG. 3 with respect to the first arm support 136 (and also with reference to FIG. 1), each of the first arm support 136 and the second arm support 138 are connected via link arms 135 to a plurality of shuttles 134a-134d (collectively, shuttles 134) that are movable along a corresponding guide rail 132a-132d (collectively, guide rails 132). Referring to FIGS. 1, 2A-2B, and 3 (with FIG. 3 showing particular detail with respect to the first arm support 136), the link arms 135 are each pivotally coupled to the respective arm supports 136, 138 with a pivot point 137, such as a pin and clevis connection or a similar pivoting connection to the receiving members 152, 153 thereof. The link arms 135 are also pivotally coupled to the shuttles 134 with a pivot point 137, such as a pin and clevis connection or a similar pivoting connection. Such pivot points 137 allow the link arms 135 coupled thereto to rotate about the pivot points 137. Thus, as the relative positioning between the first arm support 136, a first shuttle 134a of the plurality of shuttles 134, and a second shuttle 134b of the plurality of shuttles 134 changes, the link arms 135 pivot around the pivot points 137. Similarly, as the relative positioning between the second arm support 138, a third shuttle 134c of the plurality of shuttles 134, and a fourth shuttle 134d of the plurality of shuttles 134 changes, the link arms 135 pivot around the pivot points 137.

Referring again to FIG. 1, each one of the link arms 135 has a fixed length. That is, the link arms 135 are generally not adjustable in length, and thus a distance between pivot points 137 positioned on either end of a particular link arm 135 remains the same as the relative positioning between the first arm support 136, the first shuttle 134a of the plurality of shuttles 134, and the second shuttle 134b of the plurality of shuttles 134 changes and/or the relative positioning between the second arm support 138, a third shuttle 134c of the plurality of shuttles 134, and a fourth shuttle 134d of the plurality of shuttles 134 changes. In some embodiments, all of the link arms 135 may be substantially the same length. In other embodiments a first subset of the link arms 135 may have the same first length while a second subset of the link arms 135 has the same second length, whereby the first length and the second length are different from one another. In still other embodiments, various link arms 135 may have one of a plurality of lengths. Specific lengths are not limited by the present disclosure, and any length of the link arms 135 that allows for interconnection of the various components described herein via the pivot points 137 are included within the scope of the present disclosure.

Still referring to FIG. 1, the first arm support 136 and the second arm support 138 each have three link arms 135 coupled via pivot points 137 thereto. More specifically, the first arm support 136 has one link arm 135 coupled via pivot points 137 to the first shuttle 134a and two link arms 135 coupled via pivot points 137 to the second shuttle 134b, and the second arm support 138 has two link arms 135 coupled via pivot points 137 to the third shuttle 134c and one link arm 135 coupled via pivot points 137 to the fourth shuttle 134d. The link arms 135 may generally be coupled such that the two link arms 135 extending between the first arm support 136 and the second shuttle 134b are substantially parallel with respect to one another and the two link arms 135 extending between the second arm support 138 and the third shuttle 134c are substantially parallel with respect to one another. Such a relationship between the link arms 135, the arm supports 136, 138, and the shuttles 134 via the pivot points 137 may generally provide the flexibility to move the arm 144 of the powder distributor 140 as described herein. However, other combinations and amounts of link arms 135, pivot points 137 and shuttles 134 are contemplated without departing from the scope of the present disclosure.

As noted herein, the shuttles 134 are movable along the corresponding guide rails 132. For example, the first shuttle 134a is movable along a length of a first guide rail 132a, the second shuttle 134b is movable along a length of a second guide rail 132b, the third shuttle 134c is movable along a length of a third guide rail 132c, and the fourth shuttle 134d is movable along a length of a fourth guide rail 132d. Each one of the shuttles 134 may have a bore extending therethrough, each bore shaped and sized to receive a corresponding guide rail 132. The bores of each of the shuttles 134 generally extend in the +y/−y direction (e.g., a system vertical direction) of the coordinate axes of FIG. 1, though other directions are also contemplated and included within the scope of the present disclosure. Each one of the bores is coaxially aligned with a guide axis 131a-131d (collectively, guide axes 131) defined by the respective guide rails 132 such that the guide rails 132 each extend through a respective bore formed in the shuttles 134 and the bores allow the shuttles 134 to move along the respective guide rails 132. That is, a bore of the first shuttle 134a is coaxially aligned with a first guide axis 131a defined by the first guide rail 132a, a bore of the second shuttle 134b is coaxially aligned with a second guide axis 131b defined by the second guide rail 132b, a bore of the third shuttle 134c is coaxially aligned with a third guide axis 131c defined by the third guide rail 132c, and a bore of the fourth shuttle 134d is coaxially aligned with a fourth guide axis 131d defined by the fourth guide rail 132d. While FIG. 1 depicts the guide axes 131 (and also the guide rails 132) generally extending in the +y/−y direction (e.g., the system vertical direction), the present disclosure is not limited to such. That is, the guide axes 131 and guide rails 132 may extend in any other direction without departing from the scope of the present disclosure. In addition, the guide axes 131 and guide rails 132 may be all substantially parallel to one another in some embodiments and non-parallel to one another in other embodiments.

Each of the first guide rail 132a, the second guide rail 132b, the third guide rail 132c, and the fourth guide rail 132d includes a rail member 170 having a first end 171 and an opposite second end 172. In embodiments, each rail member 170 has a substantially cylindrical geometry and extends along a respective one of the guide axes 131. However, in other embodiments, each rail member 170 may have any suitable geometry such as, for example, a cuboid geometry, a triangular prism geometry, a pentagonal prism geometry, a hexagonal prism geometry, or the like.

The guide rails 132 may each have a length. That is the first guide rail 132a may have a first length $L_1$, the second guide rail 132b may have a second length $L_2$, the third guide rail 132c may have a third length $L_3$, and the fourth guide rail 132d may have a fourth length $L_4$. The first length $L_1$, the second length $L_2$, the third length $L_3$, and the fourth length $L_4$ are not limited by the present disclosure, and can generally be any length. In some embodiments, the lengths may be selected such that the guide rails 132 fit within the build tank 109. In some embodiments, the various lengths may be substantially equivalent to one another (e.g., the first length $L_1$, the second length $L_2$, the third length $L_3$, and the fourth length $L_4$ are all substantially equal). In other embodiments, the various lengths may be different (e.g., one or more of the first length $L_1$, the second length $L_2$, the third length $L_3$, and the fourth length $L_4$ may be different from other ones of the first length $L_1$, the second length $L_2$, the third length $L_3$, and the fourth length $L_4$).

The guide rails 132 are generally fixed in a particular position and having a particular positioning to provide a stable support for movement of the shuttles 134 as described herein. For example, while not depicted in FIG. 1, the guide rails 132 may be supported via mounts or the like that hold the guide rails 132 in position within the build chamber 110. For example, each of the guide rails 132 may include one or more mounts (not shown) that are fixed at various locations on the guide rails 132 (e.g., at ends of the guide rails 132). In some embodiments, the mounts may include fasteners for attaching the mounts to a surface within the build chamber 110. While FIG. 1 depicts the guide rails 132 being mounted or otherwise positioned generally in the corners of the build chamber 110, the present disclosure is not limited to such. That is, the guide rails 132 may be mounted or otherwise positioned within other parts of the build chamber 110 without departing from the scope of the present disclosure.

In some embodiments, the shuttles 134 may each have a drive assembly 139a-139d (collectively, drive assemblies 139) that drives movement of the shuttles 134 along the respective guide rails 132. That is, the first shuttle 134a may have a first drive assembly 139a that drives movement of the first shuttle 134a along the first guide rail 132a, the second shuttle 134b may have a second drive assembly 139b that drives movement of the second shuttle 134b along the second guide rail 132b, the third shuttle 134c may have a third drive assembly 139c that drives movement of the third shuttle 134c along the third guide rail 132c, and the fourth shuttle 134d may have a fourth drive assembly 139d that drives movement of the fourth shuttle 134d along the fourth guide rail 132d. Each of the drive assemblies 139 includes any suitable device and/or component for translating the respective shuttles 134 along the respective guide rails 132. For example, while not depicted in FIG. 1, each of the drive assemblies 139 may include a pair of pinions positioned proximate opposite ends of the respective guide rails 132 and including a shaft rotatably attached to a support structure. The pair of pinions may be spaced apart from one another at a distance substantially equal to a distance between the ends of the guide rails 132 to permit the respective shuttles 134 to translate across substantially an entire portion of the guide rails 132. In addition, the drive assembly 139 in such an example may also include a drive chain engaging the pair of pinions and extending along the respective guide axes 131 and a mounting device may be fixed on the drive chain for coupling the drive assembly 139 to the respective shuttle 134a-134d. Other examples of the drive assemblies 139 may include, but are not limited to, a rack and pinion gear associated with the guide rails 132 and shuttles 134, a linear actuator, and/or the like.

The shuttles 134 are each driven independently of one another by their respective drive assemblies 139. That is, each one of the drive assemblies 139 is independently controlled relative to the other ones of the drive assemblies 139 such that the shuttles 134 can be moved independently of one another. As will be described herein, the independent movement of each of the shuttles 134 can be coordinated to allow particular movement of each one of the shuttles 134 to position and/or move the powder distributor 140 in a particular manner.

Still referring to FIG. 1, a controller 190 may be communicatively coupled to one or more components of the additive manufacturing system 100, particularly the first drive assembly 139a, the second drive assembly 139b, the third drive assembly 139c, and the fourth drive assembly 139d. The controller is arranged and configured to transmit and/or receive signals and/or data to/from the first drive assembly 139a, the second drive assembly 139b, the third drive assembly 139c, and the fourth drive assembly 139d to independently control movement and positioning of each of the shuttles 134 along the respective guide rails 132, thereby adjusting a positioning of and/or moving the powder distributor 140 in a particular manner. That is, the signals and/or data provided by the controller 190 to one or more of the first drive assembly 139a, the second drive assembly 139b, the third drive assembly 139c, and the fourth drive assembly 139d cause particular movement of each of the first drive assembly 139a, the second drive assembly 139b, the third drive assembly 139c, and the fourth drive assembly 139d, which, in turn, moves one or more of the first shuttle 134a, the second shuttle 134b, the third shuttle 134c, and the fourth shuttle 134d to a particular location along one or more of the first guide rail 132a, the second guide rail 132b, the third guide rail 132c, and the fourth guide rail 132d, respectively, which translates to a particular positioning or motion of the first arm support 136 and/or the second arm support 138 to achieve a particular movement or positioning of the powder distributor 140, as described in greater detail herein. Additional details regarding the controller 190 are discussed herein with respect to FIG. 4.

Figure 4:
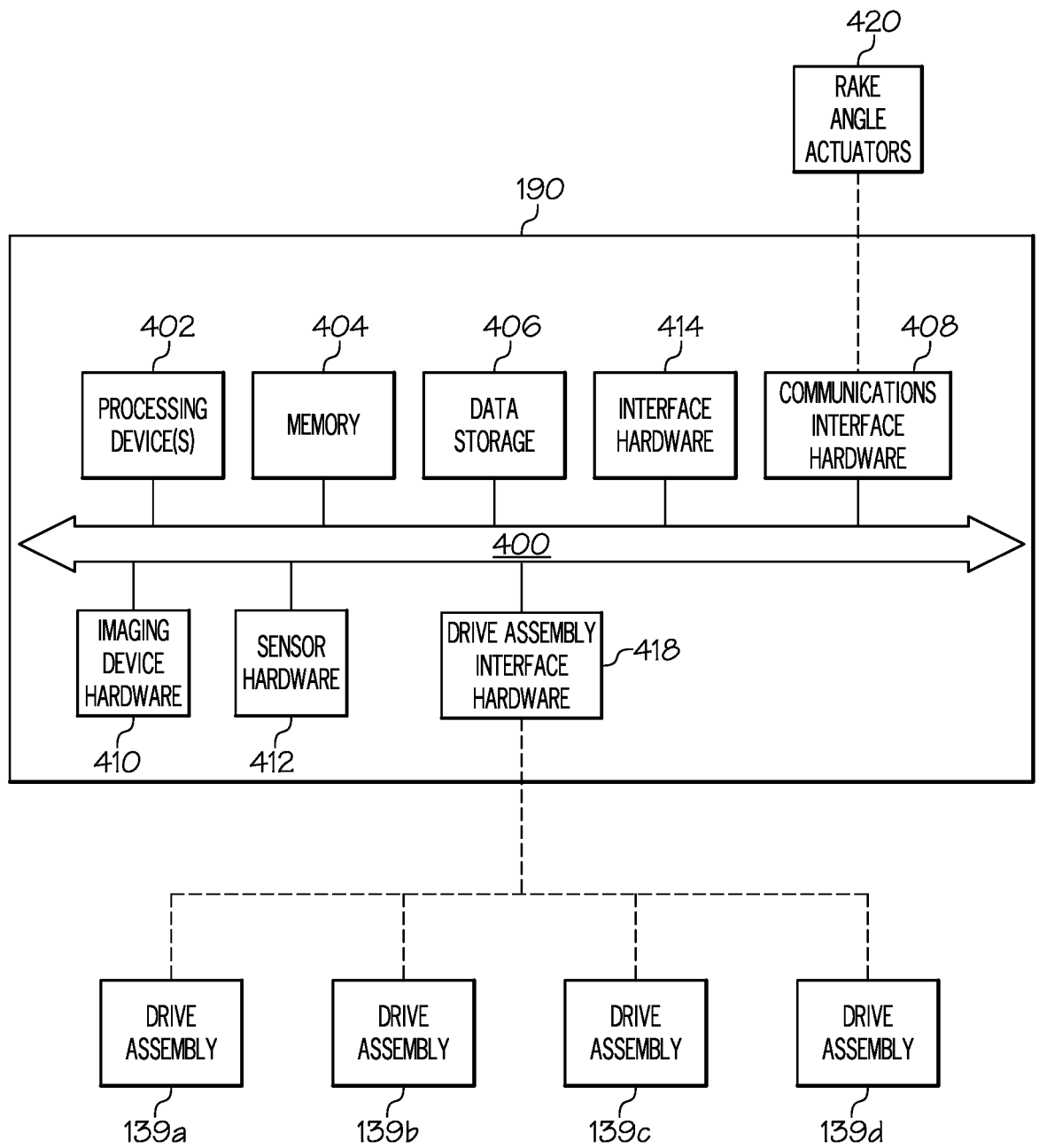
FIG. 4 depicts a block diagram of illustrative internal components of a rake guide control system used for controlling the adjustable guide system of FIG. 1.
Figure 5:
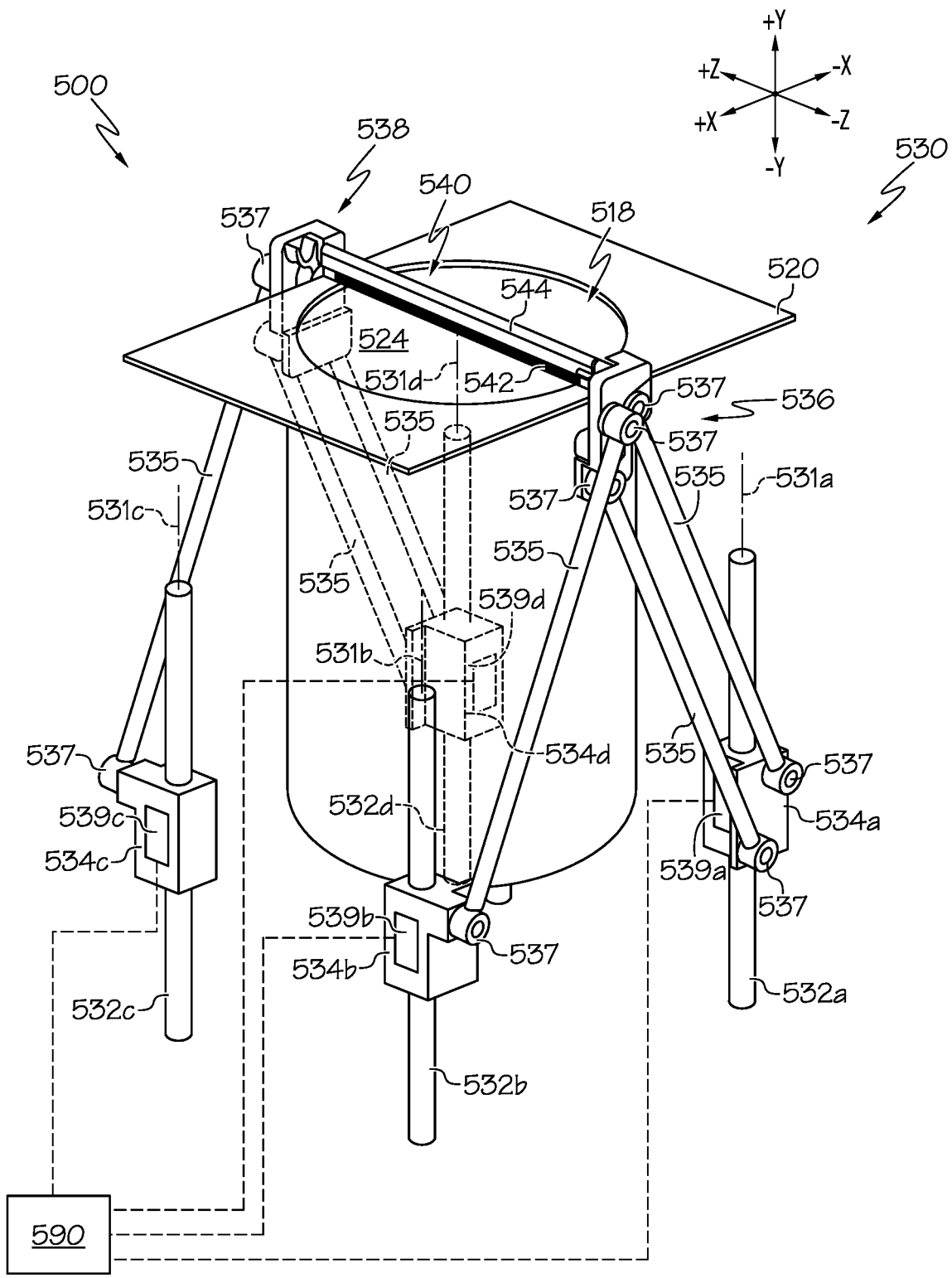
FIG. 5 depicts a perspective view of another illustrative adjustable guide system according to one or more embodiments shown and described herein.

Turning to FIG. 4, the various internal components of the controller 190 depicted in FIG. 1 is shown. Particularly, FIG. 4 depicts various components for determining a rake positioning, directing movement of components to achieve particular rake positioning, directing movement of components for particular rake movement, sensing a powder layer, and/or the like.

As illustrated in FIG. 4, the controller 190 may include one or more processing devices 402, a non-transitory memory component 404, a data storage component 406, communications interface hardware 408, imaging device hardware 410 for one or more imaging devices, sensor hardware 412 for one or more sensors, actuator interface hardware 414, and/or drive assembly interface hardware 418. A local interface 400, such as a bus or the like, may interconnect the various components.

The one or more processing devices 402, such as a computer processing unit (CPU), may be the central processing unit of the controller 190, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 406 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to complete various processes, such as the processes described herein with respect to FIG. 10.

Still referring to FIG. 4, the programming instructions stored on the memory component 404 may be embodied as a plurality of software logic modules, where each logic module provides programming instructions for completing one or more tasks. Each of the logic modules may be embodied as a computer program, firmware, or hardware, as an example. Illustrative examples of logic modules present in the memory component 404 include, but are not limited to, data receiving logic, data analysis logic, movement determination logic, calibration logic, and/or device interface logic. The data receiving logic includes one or more programming instructions for receiving data from various components, such as the imaging device hardware 410 and/or the sensor hardware 412. That is, the data receiving logic may cause a connection between the one or more processing devices 402 and the imaging device hardware 410 and/or the sensor hardware 412 such that data transmitted by the imaging device hardware 410 and/or the sensor hardware 412 is received by the one or more processing devices 402. Further, the data may be stored (e.g., within the data storage component 406). The data analysis logic includes one or more programming instructions for analyzing the data received from the imaging device hardware 410 and/or the sensor hardware 412. The movement determination logic may generally include programming instructions for directing movement of each of the drive assemblies 139a-139d and/or one or more rake angle actuators 420 to achieve a particular positioning and/or movement of the powder distributor 140 (FIG. 1), as described herein. The calibration logic includes one or more programming instructions for calibrating the drive assemblies 139a-139d such that movement of the shuttles 134a-134d (FIG. 1) coupled to the drive assemblies 139a-139d is completed in a coordinated manner to achieve a particular positioning and/or movement of the powder distributor 140 (FIG. 1). The device interface logic includes one or more programming instructions for establishing communicative connections with the various devices or components of the additive manufacturing system 100 (FIG. 1). For example, the device interface logic may include programming instructions usable to establish connections with the drive assemblies 139a-139d and/or the rake angle actuators 420, as described herein.

Referring to FIGS. 1 and 4, the data storage component 406, which may generally be a storage medium, may contain one or more data repositories for storing data that is received and/or generated. The data storage component 406 may be any physical storage medium, including, but not limited to, a hard disk drive (HDD), memory, removable storage, and/or the like. While the data storage component 406 is depicted as a local device, it should be understood that the data storage component 406 may be a remote storage device, such as, for example, a server computing device, cloud based storage device, or the like. Illustrative data that may be contained within the data storage component 406 includes, but is not limited to, sensed data, movement data, positioning data, calibration data, and/or the like. Sensed data may generally be data that is received from the imaging device hardware 410 and/or the sensor hardware 412. Movement data may generally be data that pertains to a movement of various components, such as, for example, movement of the shuttles 134a-134d coupled to the drive assemblies 139a-139d and/or the one or more rake angle actuators 420. Positioning data may be data that pertains to a particular positioning of various components of the additive manufacturing system 100 (FIG. 1), such as a positioning of each of the shuttles 134a-134d coupled to the drive assemblies 139a-139d and/or the one or more rake angle actuators 420, which in turn cause particular positioning of the powder distributor 140, as described herein. Calibration data may be data pertaining to a calibration of the drive assemblies 139a-139d to achieve a particular positioning and/or movement of the powder distributor 140, as described herein.

Still referring to FIG. 4, the communications interface hardware 408 may include any wired or wireless networking hardware, such as a modem, LAN port, wireless fidelity (Wi-Fi) card, WiMax card, long term evolution (LTE) card, mobile communications hardware, and/or other hardware for communicating with other networks and/or devices. For example, the communications interface hardware 408 may be used to facilitate communication between external storage devices, user computing devices, server computing devices, external controllers, and/or the like via a network, such as, for example, a local network, the Internet, and/or the like.

Referring to FIGS. 1 and 4, the imaging device hardware 410 generally includes one or more devices located in an area within or adjacent to the build chamber 110 and positioned to obtain information within the build chamber 110, such as, for example, powder layer size and configuration, a location, configuration, and/or movement of the drive assemblies 139a-139d (and the shuttles 134a-134d coupled thereto), a location, configuration, and/or movement of the powder distributor 140, and/or the like. In some embodiments, the imaging device hardware 410 may be located in the exterior environment outside the build chamber 110, yet positioned such that the field of view or sensed area of the imaging device hardware 410 captures an area within build chamber 110. It should be understood that in such embodiments, the one or more chamber walls of the build tank 109 and/or the build chamber 110 may include a window or the like such that the imaging device hardware 410 can be positioned adjacent to the window to capture the one or more images. In the embodiments where the imaging device hardware 410 is positioned outside the build chamber 110, the harsh environment within the interior of the build chamber 110 does not affect operation of the imaging device hardware 410. That is, the heat, dust, metallization, and/or the like that occurs within the interior of the build chamber 110 will not affect operation of the imaging device hardware 410. In some embodiments, the imaging device hardware 410 is fixed in position such that a field of view or sensed area thereof remains constant (e.g., does not change). In such embodiments, the imaging device hardware 410 is arranged in the fixed position such that a field of view or sensed area of the imaging device hardware 410 encompasses an entirety of the build envelope 118. In some embodiments, the imaging device hardware 410 may be a camera (e.g., a still camera, a video camera, etc.) or the like.

As such, the imaging device hardware 410 may obtain one or more images of the interior of the build chamber 110. In some embodiments, the imaging device hardware 410 may be particularly configured (e.g., via components such as filters, image sensors, and/or the like) to obtain information in the infrared (IR) spectrum, the near infrared (NIR) spectrum, and/or the visible spectrum.

Still referring to FIGS. 1 and 4, the sensor hardware 412 generally includes one or more devices located in an area within or adjacent to the build chamber 110 and positioned to obtain information within the build chamber 110, such as, for example, powder layer size and configuration, a location, configuration, and/or movement of the shuttles 134a-134d, a location, configuration, and/or movement of the powder distributor 140, and/or the like. For example, the sensor hardware 412 may include various tilt sensors that are mounted to the powder distributor 140 in such a manner to provide information pertaining to an orientation of the powder distributor 140. In another example, the sensor hardware 412 may include various position sensors that are mounted to one or more components within the build chamber 110 (e.g., the powder distributor 140, one or more of the shuttles 134a-134d, one or more of the link arms 135, one or more of the guide rails 132a-132d). That is, the sensor hardware 412 may include a sensor such as a Hall effect sensor or other sensor configured to sense a position of a component within the build chamber 110, and the data from such a sensor may be usable for the purposes of determining a positioning of components, determining movements to adjust components accordingly, and/or the like, as described herein.

It should be understood that while FIG. 4 depicts the imaging device hardware 410 and the sensor hardware 412 as being located within the controller 190, this is merely illustrative. That is, in some embodiments, the imaging device hardware 410 and/or the sensor hardware 412 may be located external to the controller and communicatively coupled to the controller 190 (e.g., via the communications interface hardware 408 or the like). It should also be understood that the imaging device hardware 410 and/or the sensor hardware 412 are optional components and may be omitted in some embodiments. That is, certain embodiments may only include the imaging device hardware 410, certain embodiments may only include the sensor hardware 412, and certain embodiments may not include either of the imaging device hardware 410 or the sensor hardware 412.

Still referring to FIGS. 1 and 4, the actuator interface hardware 414 may include any wired or wireless networking hardware, such as a modem, LAN port, wireless fidelity (Wi-Fi) card, WiMax card, long term evolution (LTE) card, mobile communications hardware, and/or other hardware for communicating with the rake angle actuators 420. For example, the actuator interface hardware 414 may be used to transmit signals to the rake angle actuators 420 from the one or more processing devices 402 that cause the rake angle actuators to move to adjust the angle of the arm 144 of the powder distributor such that the teeth 142 are angled in a particular manner with respect to the build platform 120. In another example, the actuator interface hardware 414 may be used to receive signals from the rake angle actuator 420 that are usable by the one or more processing devices 402 to determine the angle of the teeth 142.

The drive assembly interface hardware 418 may include any wired or wireless networking hardware, such as a modem, LAN port, wireless fidelity (Wi-Fi) card, WiMax card, long term evolution (LTE) card, mobile communications hardware, and/or other hardware for communicating with the drive assemblies 139a-139d. For example, the drive assembly interface hardware 418 may be used to transmit signals to each of the drive assemblies 139a-139d from the one or more processing devices 402 that cause the drive assemblies 139a-139d drive movement of the associated shuttles 134a-134d. In another example, the drive assembly interface hardware 418 may be used to receive signals from the drive assemblies 139a-139d that are usable by the one or more processing devices 402 to determine a location and/or movement of the drive assemblies 139a-139d (and therefore the shuttles 134a-134d, the link arms 135 coupled thereto, and the powder distributor 140).

It should be understood that the components illustrated in FIG. 4 are merely illustrative and are not intended to limit the scope of this disclosure. More specifically, while the components in FIG. 4 are illustrated as residing within the controller 190, this is a nonlimiting example. In some embodiments, one or more of the components may reside external to the controller 190.

It should be understood that the embodiment depicted in FIGS. 1-4 is merely one embodiment of the present disclosure, and other configurations of the additive manufacturing system 100 are contemplated and included within the scope of the present disclosure. For example, FIG. 5 depicts another embodiment whereby an alternative additive manufacturing system 500 includes work surface 520 incorporating a movable build platform 524.

Referring now to FIG. 5, the movable build platform 524 may generally be a surface within the build envelope 518 (e.g., at least a portion of the work surface 520) that is movable by a lifting component (not shown) in a system vertical direction (e.g., in the +y/−y directions of the coordinate axes of FIG. 5) to increase and/or decrease a total volume of the build envelope 518. For example, the movable build platform 524 within the build envelope 518 may be movable by the lifting component in a downward direction (e.g., toward the −y direction of the coordinate axes of FIG. 5) so as to increase the volume of the build envelope 518. The movable build platform 524 may be movable (e.g., capable of being lowered) by the lifting component to add each successive powder layer to the article being formed, as described in greater detail herein. While FIG. 5 depicts the movable build platform 524 as being generally circular in shape and only including a portion of the work surface 520, this is merely one illustrative example. That is, the movable build platform 524 may be any shape and/or size without departing from the scope of the present disclosure. Further, the movable build platform 524 may be any portion of the work surface 520, up to and including an entirety of the work surface 520 (e.g., such that the entire work surface 520 is the movable build platform 524) without departing from the scope of the present disclosure.

The lifting component is not limited by the present disclosure, and may generally be any device or system capable of being coupled to the movable build platform 524 and movable to raise or lower the movable build platform 524 in the system vertical direction (e.g., in the +y/−y directions of the coordinate axes of FIG. 5). In some embodiments, the lifting component may utilize a linear actuator type mechanism to effect movement of the movable build platform 524. Illustrative examples of devices or systems suitable for use as the lifting component include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component may be located within the build tank and/or the build chamber. In other embodiments, the lifting component may be only partially located within the build tank and/or the build chamber, particularly in embodiments where it may be desirable to isolate portions of the lifting component that are sensitive to the harsh conditions (e.g., high heat, excessive dust, etc.) within the interior of the build tank.

Also depicted in FIG. 5 are a plurality of guide rails 532 (e.g., a first guide rail 532a, a second guide rail 532b, a third guide rail 532c, and a fourth guide rail 532d) upon which a plurality of shuttles 534 (e.g., a first shuttle 534a, a second shuttle 534b, a third shuttle 534c and a fourth shuttle 534d) are movable along respective guide axes 531 (e.g., a first guide axis 531a, a second guide axis 531b, a third guide axis 531c, and a fourth guide axis 531d) via drive assemblies 539 (e.g., a first drive assembly 539a, a second drive assembly 539b, a third drive assembly 539c, and a fourth drive assembly 539d) and controlled by a controller 590, each one of the plurality of shuttles 534 coupled to link arms 535 via pivot points 537 to a first arm support 536 and a second arm support 538 that support a powder distributor 540 including an arm 544 extending between the first arm support 536 and the second arm support, as well as teeth 542. The guide rails 532, the guide axes 531, the plurality of shuttles 534, the drive assemblies 539, the controller 590, the link arms 535, the pivot points 537, the first arm support 536, the second arm support 538, the powder distributor 540, the arm 544, and the teeth 542 are similar to the guide rails 132, the guide axes 131, the plurality of shuttles 134, the drive assemblies 139, the controller 190, the link arms 135, the pivot points 137, the first arm support 136, the second arm support 138, the powder distributor 140, the arm 144, and the teeth 142 described and depicted with respect to FIGS. 1-3. As such, for the purposes of brevity, further description of the guide rails 532, the guide axes 531, the plurality of shuttles 534, the drive assemblies 539, the controller 590, the link arms 535, the pivot points 537, the first arm support 536, the second arm support 538, the powder distributor 540, the arm 544, and the teeth 542 will not be provided herein. Instead of being positioned above the movable build platform 524 as is the case in the embodiments of FIGS. 1-3, the guide rails 532, the guide axes 531, the plurality of shuttles 534, the link arms 535, and at least some of the pivot points 537 are located below the build platform 524 (e.g., towards the −y direction of the coordinate axes of FIG. 5). However, the functionality of such components is similar to the functionality described hereinabove. It should be understood that the configuration depicted in FIG. 5 may be to maximize the amount of space above the movable build platform 524 in some embodiments.

Figure 6:
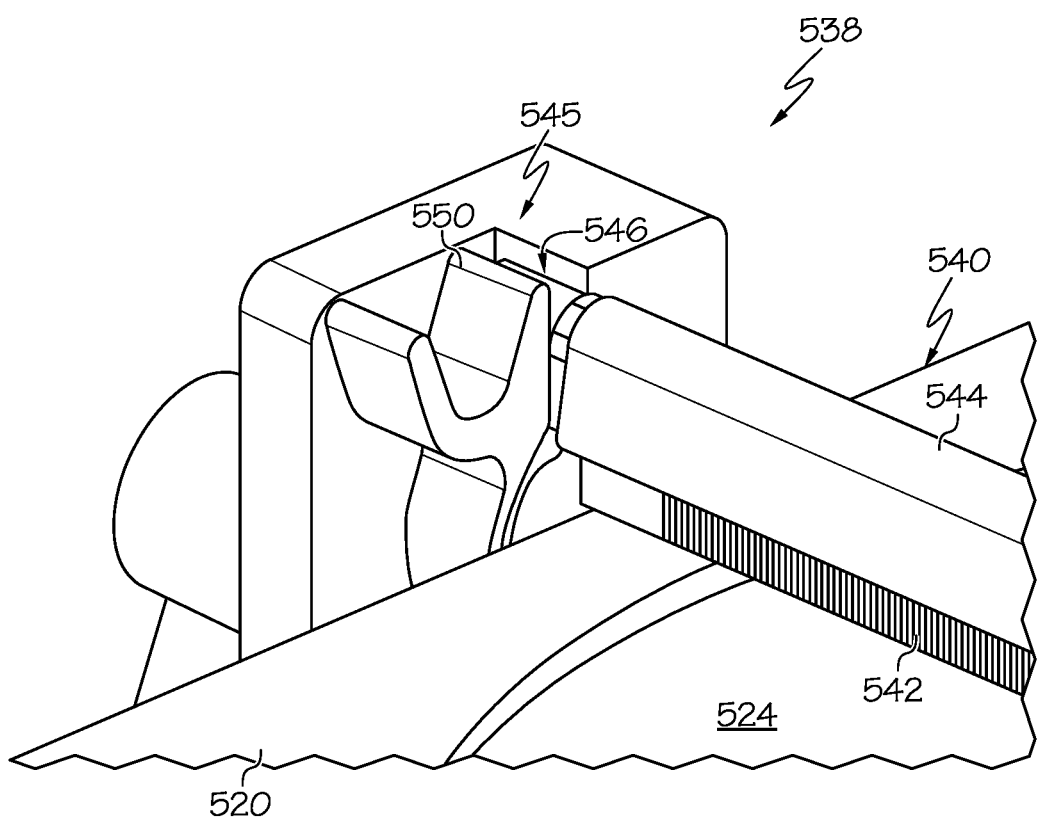
FIG. 6 depicts a detailed perspective view of a connection of an illustrative rake to an illustrative rake support of the adjustable guide system of FIG. 5.

Referring now to FIG. 6, in some embodiments, the first arm support (not shown) and the second arm support 538 may be coupled to the arm 544 of the powder distributor 540 so as to allow the teeth 542 of the powder distributor 540 to be angled relative to the work surface 520 and/or the movable build platform 524. That is, the first arm support (not shown) and the second arm support 538 may each incorporate a biasing assembly 550 (e.g. a spring or the like) that biases an end 546 of the arm 544 within a cavity 545. The biasing force can be overcome to allow for fast insertion or removal of the arm 544. It should be understood that the biasing assembly 550 is merely illustrative, and the arm may be held within the cavity 545 via other components, fasteners, or the like, such as screws, bolts, rivets, or the like.

Figure 7:
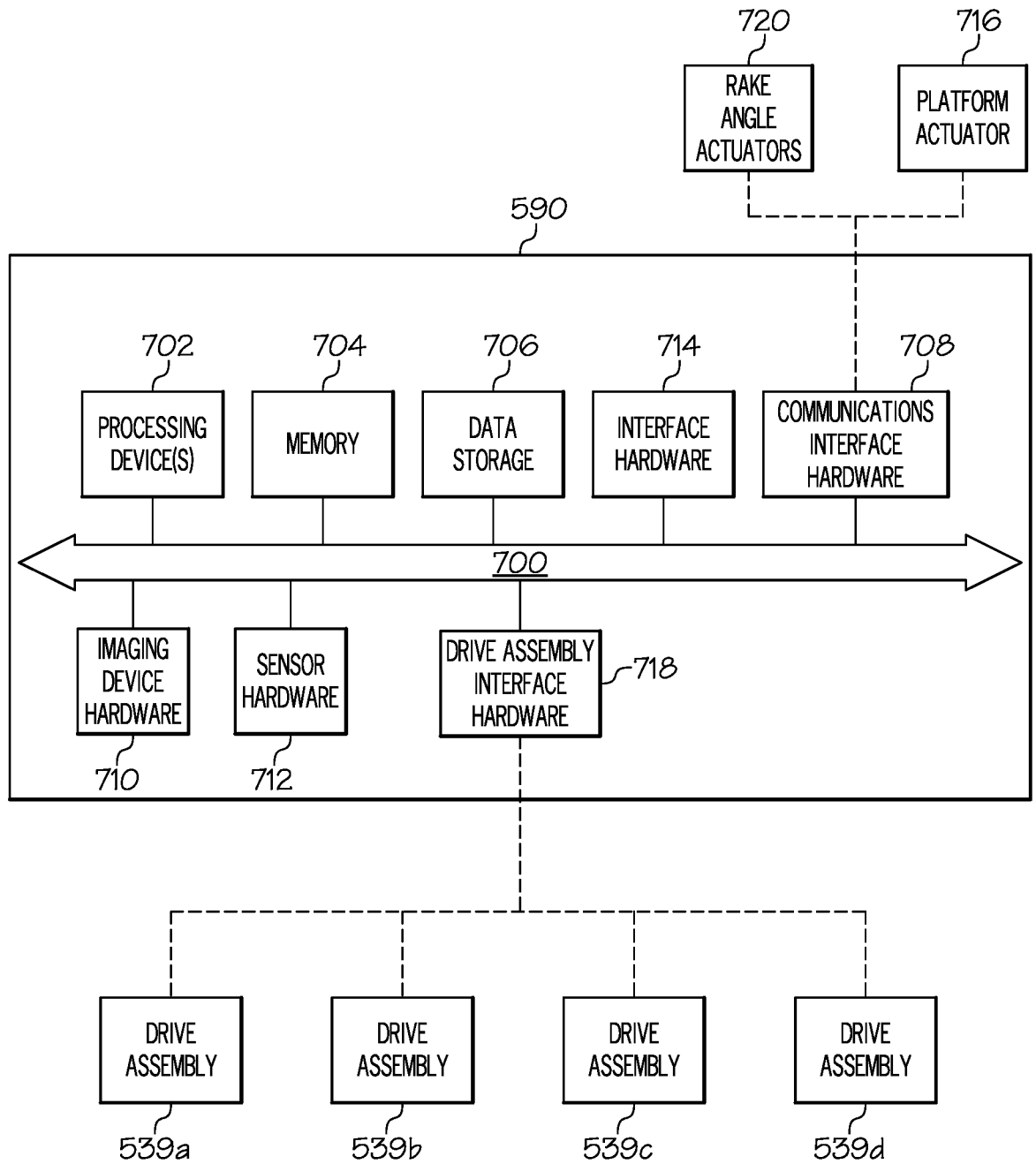
FIG. 7 depicts a block diagram of illustrative internal components of another rake guide control system used for controlling the adjustable guide system of FIG. 5.

Referring now to FIG. 7, the various internal components of the controller 590 depicted in FIG. 5 is shown. Particularly, FIG. 7 depicts various components for determining a rake positioning, directing movement of components to achieve particular rake positioning, directing movement of components for particular rake movement, sensing a powder layer, and/or the like.

As illustrated in FIG. 7, the controller 590 may include one or more processing devices 702, a non-transitory memory component 704, a data storage component 706, communications interface hardware 708 that is communicatively coupled to one or more rake angle actuators 720 that control the rake angle as described herein and/or a platform actuator 716 that controls the movement of the movable build platform 524 (FIG. 5) as described herein, imaging device hardware 710 for one or more imaging devices, sensor hardware 712 for one or more sensors, interface hardware 714, and/or drive assembly interface hardware 718 for interfacing with the drive assemblies 539a-539d. A local interface 700, such as a bus or the like, may interconnect the various components. The various components of FIG. 7 are generally similar in functionality to the corresponding components of FIG. 4. As such, for the purposes of brevity, additional details regarding the components of FIG. 7 will not be discussed herein.

It should be understood that the components illustrated in FIG. 7 are merely illustrative and are not intended to limit the scope of this disclosure. More specifically, while the components in FIG. 7 are illustrated as residing within the controller 590, this is a nonlimiting example. In some embodiments, one or more of the components may reside external to the controller 590.

The various embodiments depicted in FIGS. 1-7 should now generally be understood. That is, the embodiments depicted in FIGS. 1-4 relates to a system whereby the adjustable guide system is located above the build platform, and FIGS. 5-7 relates to a system whereby various portions of the adjustable guide system is location below the build platform. Movement of the adjustable guide system depicted in FIGS. 1-4 will be described with respect to 8A-8C, but it should be understood that a similar movement is achieved with the system of FIGS. 5-7.

Figure 8A:
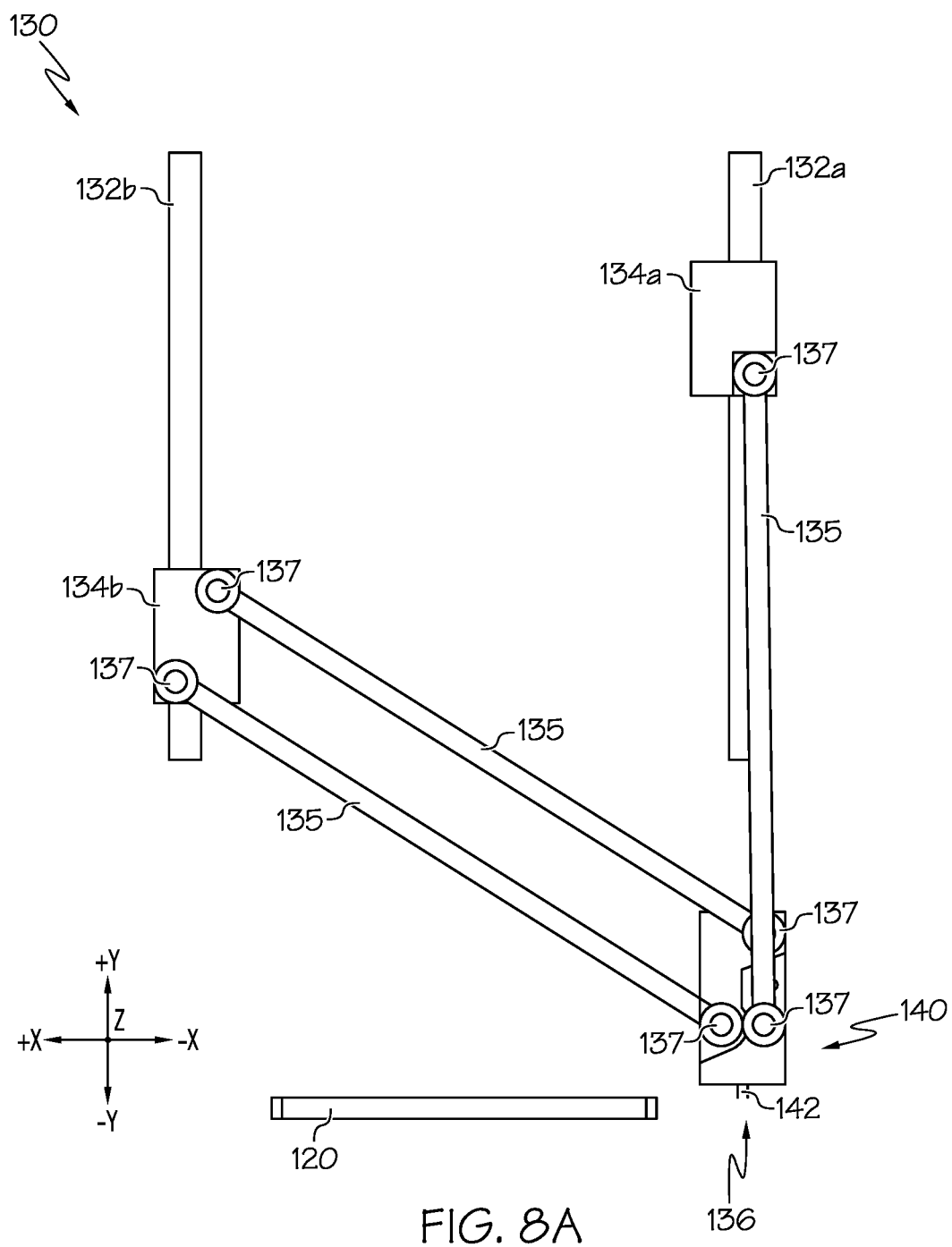
FIG. 8A depicts a front view of the adjustable guide system of FIG. 1 in a first orientation according to one or more embodiments shown and described herein.

Referring now to FIG. 8A, which depicts a side view of the adjustable guide system 130 of FIG. 1, the adjustable guide system 130 may position the powder distributor 140 relative to the build platform 120 in an initial position whereby the one or more teeth 142 are positioned off to a side of the build platform 120 for the purposes of allowing powder (not shown) to fall under force of gravity or otherwise be deposited over at least a portion of the build platform 120 so that the powder can be distributed by raking the one or more teeth 142. For example, as shown in FIG. 8A, the initial position is such that the first shuttle 134a is positioned towards an upper part of the first guide rail 132a (e.g., towards the +y direction of the coordinate axes of FIG. 8A) and the second shuttle 134b is positioned toward a lower part of the second guide rail 132b (e.g., towards the −y direction of the coordinate axes of FIG. 8A) such that the link arm 135 coupled between the first shuttle 134a and the first arm support 136 is rotated via the respective pivot points 137 to a substantially vertical positioning (e.g., substantially parallel to the +y/−y axis of the coordinate axes of FIG. 8A) and the two link arms 135 coupled between the second shuttle 134b and the first arm support 136 are rotated via the respective pivot points 137 to an angled positioning. As a result, the first arm support 136 and the powder distributor 140 coupled thereto are positioned beneath (e.g., towards the −y direction of the coordinate axes of FIG. 8A) the first shuttle 134a and at a location that is off to a side of the build platform 120. While not shown in FIG. 8, a similar positioning of the third shuttle 134*c* and fourth shuttle 134*d* (FIG. 1) provides a positioning of the second arm support 138 (FIG. 1).

Figure 8B:
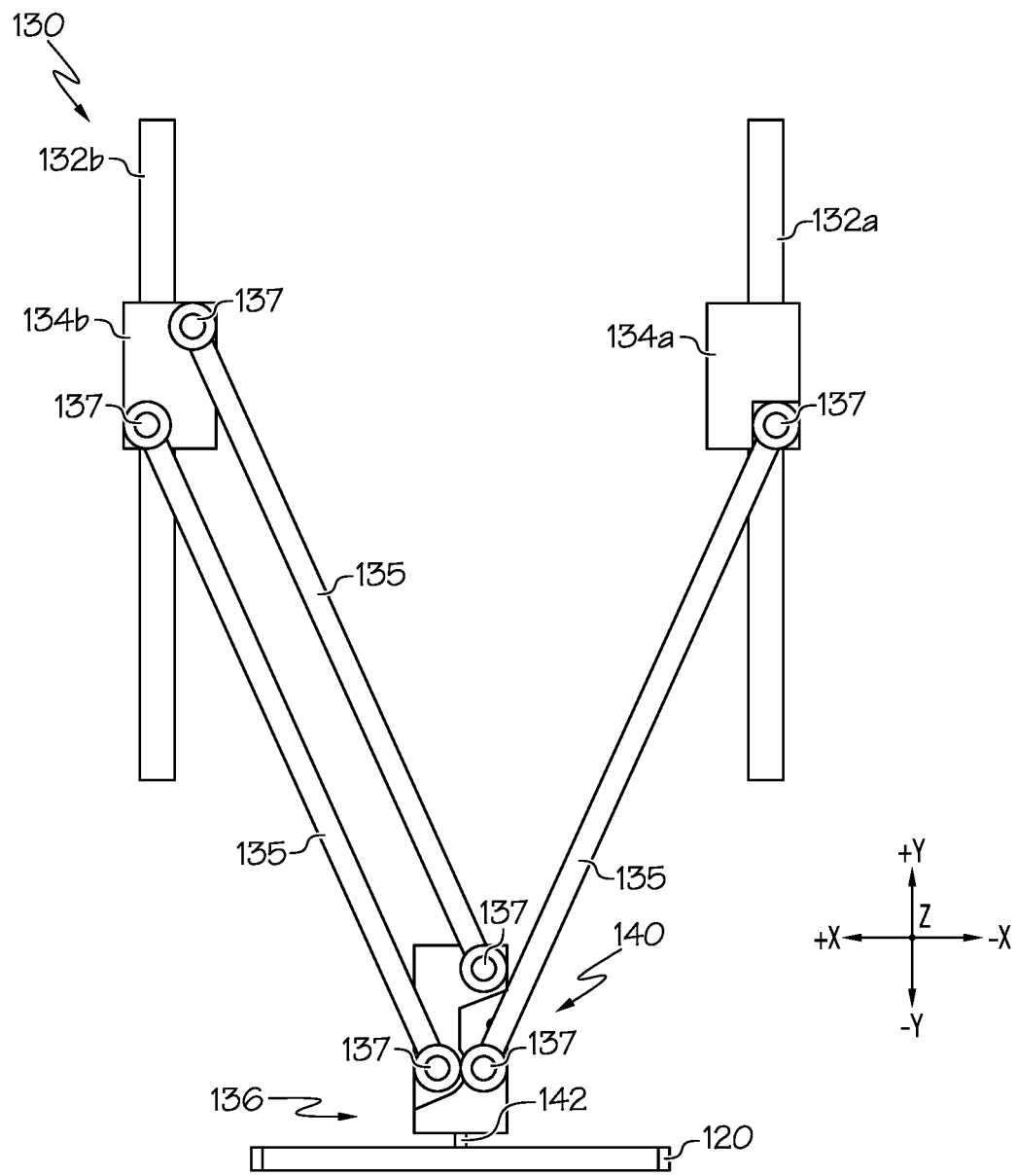
FIG. 8B depicts a front view of the adjustable guide system of FIG. 1 moved to a second orientation from the first orientation of FIG. 8A.
Figure 8C:
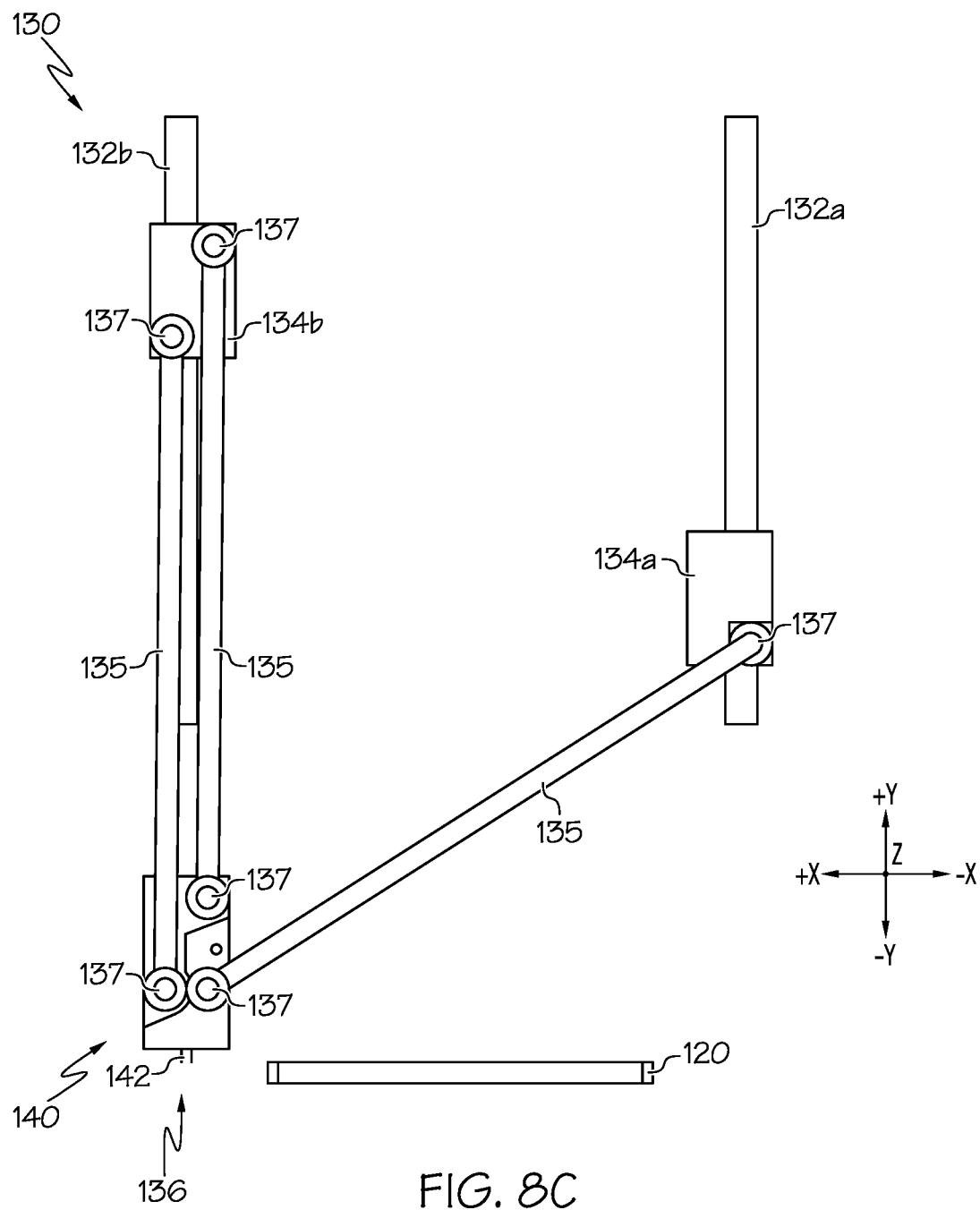
FIG. 8C depicts a front view of the adjustable guide system of FIG. 1 moved to a third orientation from the second orientation of FIG. 8B.

Referring now to FIGS. 8B and 8C, to move the first arm support 136 (and thus the powder distributor 140 and the one or more teeth 142) in a lateral direction over the build platform 120 (e.g., in the +x direction of the coordinate axes of FIGS. 8B and 8C), movement of the first shuttle 134*a* and the second shuttle 134*b* may be coordinated whereby the first shuttle 134*a* moves downwards (e.g., towards the −y direction of the coordinate axes of FIGS. 8B and 8C) along the first guide rail 132*a* at a rate that is substantially similar to a rate of movement of the second shuttle 134*b* upwards (e.g., towards the +y direction of the coordinate axes of FIGS. 8B and 8C) along the second guide rail 132*b*. This coordinated movement causes rotational movement of the link arms 135 via the respective pivot points 137 to cause the first arm support 136 to move the powder distributor 140 towards the +x direction of the coordinate axes of FIGS. 8B-8C and also maintains the angle of the one or more teeth 142 relative to the build platform 120 to ensure a particular distribution of powder over the build platform 120. It should be understood that a non-coordinated movement of the shuttles 134 would result in the one or more teeth 142 becoming angled relative to the build platform, which could potentially result in a different particular distribution of powder over the build platform 120. It should also be understood that a similar movement of the third shuttle 134*c* and the fourth shuttle 134*d* (FIG. 1) also causes a similar movement of the second arm support 138 (FIG. 1), and that a coordinated movement of such shuttles with the first shuttle 134*a* and the second shuttle 134*b* ensures that the second arm support 138 (FIG. 1) moves in accordance with the first arm support 136.

Figure 9:
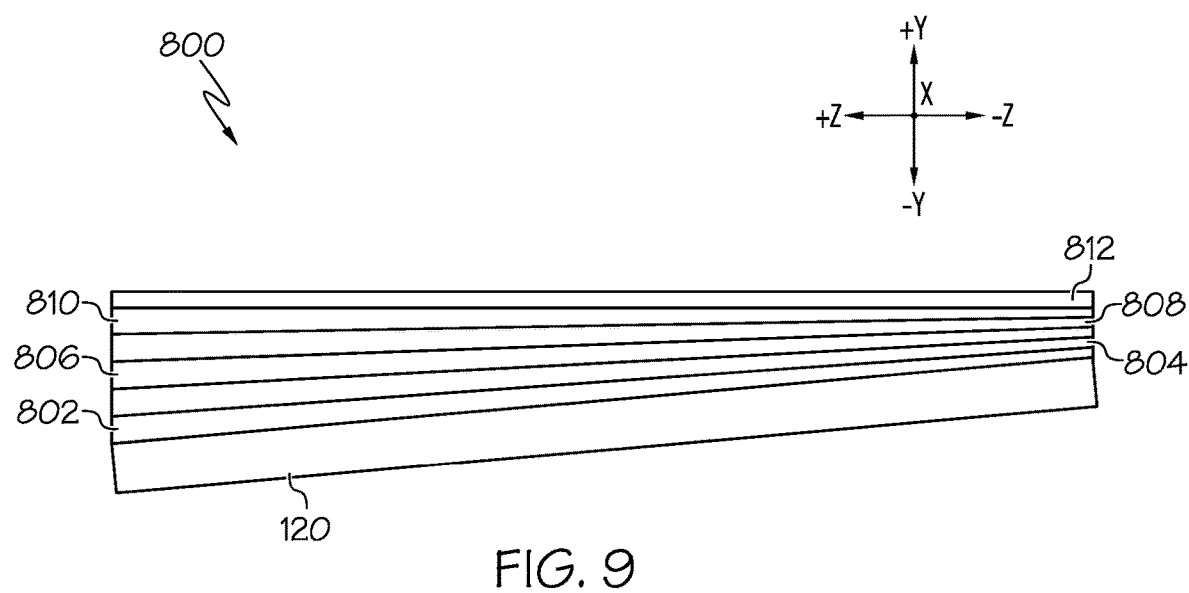
FIG. 9 depicts a side view of a plurality of illustrative layers of material distributed on a misaligned start plate by a rake coupled to an adjustable guide system according to one or more embodiments shown and described herein.

It should be appreciated that particular movement of each of the components of the adjustable guide system 130 translates to particular movement and positioning of the powder distributor 140 (and thus the one or more teeth 142) relative to the build platform 120 to achieve a particular distribution of powder on the build platform 120. Further, particular movement of the components of the adjustable guide system 130 components allows for the powder distributor 140 to be moved upwards (e.g., in the +y direction) for the purposes of distributing each successive layer of powder without moving the build platform 120. This movement also allows for the formation of powder layers that may not be uniform (if desired) or substantially normal to a system vertical direction. This may be particularly useful in embodiments where the build platform 120 is not normal to the system vertical direction (e.g., the y-axis of the coordinate axes), but it is desired to have layers of powder that are normal to the system vertical direction. For example, as shown in FIG. 9, the build platform 120 may be non-normal to the system vertical direction defined by the y-axis of FIG. 9. Previous additive manufacturing systems would have to shut down an entire build process to correct this defect before additive manufacturing could commence, which is time consuming and expensive. However, the systems described herein allow for corrective additive manufacturing via use of the adjustable guide system 130 (FIG. 1) without the need to shut down additive manufacturing, thereby maintaining the "up-time" for the systems described herein. More specifically, the adjustable guide system 130 (FIG. 1) may be positioned to spread a first layer 802 of material on the build platform 120 such that one side the first layer 802 of material is thicker than a second side thereof. This process may be repeated for each of a second layer 804 of material, a third layer 806 of material, a fourth layer 808 of material, and a fifth layer 810 of material so that, when a sixth layer 812 of material is deposited on the fifth layer 810, the sixth layer 812 is normal to the system vertical direction. As such, a top surface of an article 800 formed from each of the layers 802-812 is normal to the system vertical direction.

Referring to FIGS. 1 and 5, in operation, during a work cycle, the adjustable guide systems 130 (FIG. 1) and 530 (FIG. 5) may raise the powder distributors 140 (FIG. 1) and 540 (FIG. 5) and/or the build platform 524 (FIG. 5) may be lowered successively (e.g., in the −y direction of the coordinate axes) after each added powder layer is placed. In an example embodiment, an article may be formed through successive fusion of layers of raw material on the build platform 120, 524. Each layer corresponds to successive cross sections of an article. Such a fusion may be particularly completed based on instructions generated from a model of the article. In some embodiments, the model may be generated via a CAD (Computer Aided Design) tool.

In embodiments, a layer from the raw material may be provided on the build platform 120. The layer from the raw material may then be collected by the powder distributor 140 (FIG. 1) or 540 (FIG. 5) by moving the powder distributor 140, 540 (via the respective adjustable guide system 130, 530) a particular distance in a first direction (e.g., in a direction along the plane formed by the x-axis and the z-axis of the coordinate axes) into the scree of the raw material, thereby allowing a particular amount of the raw material to fall over a top of the powder distributor 140, 540. The powder distributor 140, 540 is then moved (via the respective adjustable guide system 130, 530) in a second direction (e.g., in another direction along the plane formed by the x-axis and the z-axis of the coordinate axes). In some embodiments, the second direction may be opposite to the first direction. Movement of the powder distributor 140, 540 in the second direction may remove the particular amount of the raw material, which has fallen over the top of the powder distributor 140, 540, from the scree of the raw material.

The particular amount of the raw material removed from the scree of the raw material (or provided by any other suitable mechanism) in front of the powder distributor 140, 540 (e.g., adjacent to a leading end of the powder distributor 140, 540) may be moved over the build envelope 118 and/or the build platform 120, 524 by means of the powder distributor 140, 540, thereby distributing the particular amount of the raw material over the build platform 120, 524.

One or more electron beams emitted from EB guns may be directed over the build platform 120, 524, thereby causing the powder layer to fuse in particular locations to form a first cross section of the article according to the model generated via the CAD tool. The movement of the one or more electron beams are controlled by the EB guns such that the electron beams are directed over the build platform 120, 524 based on instructions provided by the controller 190, 590 or another device.

After a first powder layer is finished (e.g., after the fusion of raw material for making a first layer of the article), a second powder layer is provided on the first powder layer. The second powder layer may be distributed according to the same manner as the previous layer, as described herein. However, in some embodiments, there might be alternative methods in the same additive manufacturing machine for distributing the raw material. For instance, a first layer may be provided by means of a first powder distributor and a second layer may be provided by a second powder distributor. After the second powder layer is distributed on the first powder layer, the one or more electron beams are directed over the build platform 120, 524, causing the second powder layer to fuse in selected locations to form a second cross section of the article. Fused portions in the second layer may be bonded to fused portions of said first layer. The fused portions in the first and second layer may be melted together by melting not only the material in the uppermost layer but also remelting at least a portion of a thickness of a layer directly below the uppermost layer.

Figure 10:
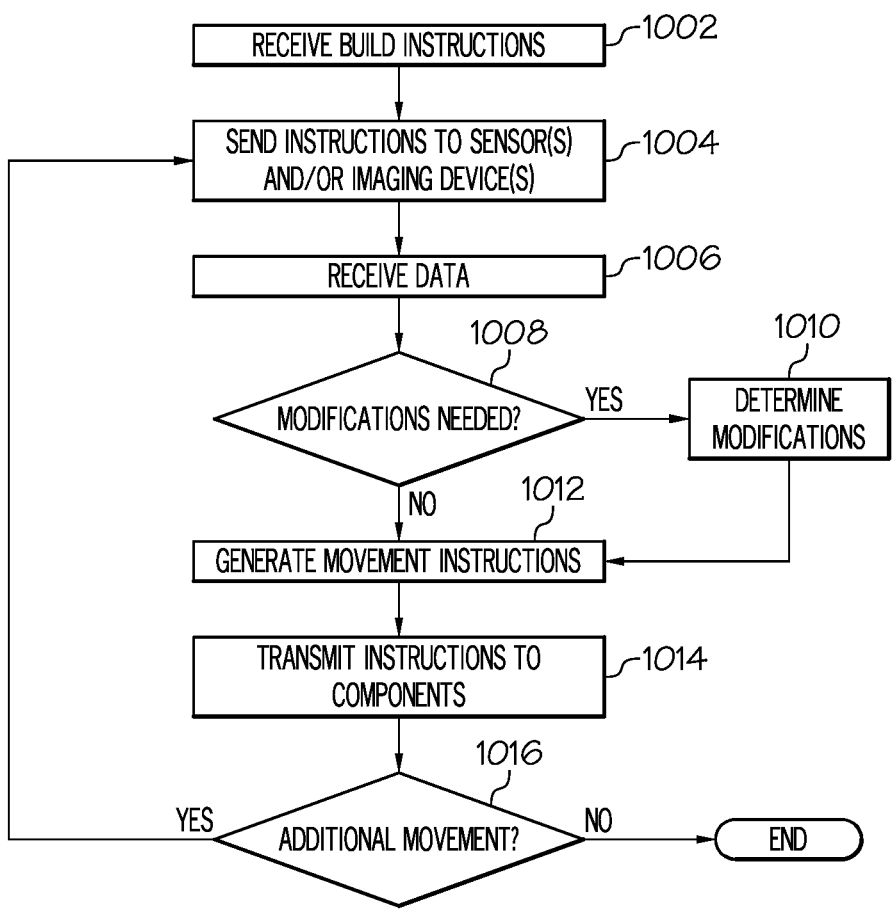
FIG. 10 depicts a flow diagram an illustrative method of forming an article using an adjustable guide system according to one or more embodiments shown and described herein.

FIG. 10 depicts a flow diagram of an illustrative method of forming an article using an adjustable guide system described herein. FIG. 10 will be described with reference to FIGS. 1-4, but it should be understood that the same or similar processes as described in FIG. 10 may also be applied to the components described herein with respect to FIGS. 5-7. Referring now to FIGS. 1-4 and 10, at block 1002, the controller 190 may receive build instructions. For example, an external device, such a server containing build instructions, a computing device operated by a user, and/or the like may interface with the controller 190 (e.g., via the communications interface hardware 408) to provide build instructions. The build instructions may be, for example, a model or the like (e.g., a CAD file) that is usable to generate movement instructions therefrom. In some embodiments, the build instructions may be a set of movement instructions for causing movement of the various components of the adjustable guide system 130.

At block 1004, the controller 190 may send instructions to one or more sensors and/or imaging devices (e.g., via the imaging device hardware 410 and/or the sensor hardware 412) to sense the build envelope 118 and all of the components contained therein for the purposes of determining whether adjustments may be necessary to ensure appropriate distribution of build material to form an article in accordance with the received instructions. For example, adjustments may be necessary if the build platform 120 is not normal with respect to the system vertical direction, as shown in FIG. 9. Still referring to FIGS. 1-4 and 10, in response, the various sensors and/or imaging devices may transmit data that is received at block 1006 (e.g., received via the imaging device hardware 410 and/or the sensor hardware 412).

At block 1008, the controller 190 determines whether any modifications are needed to the build instructions based on the information received from the sensors so as to ensure that an article is correctly formed. If modifications are needed, the process proceeds to block 1010. If modifications are not needed the process proceeds to block 1012. At block 1010, the controller 190 determines which modifications are needed as a set of movement instructions that are provided to the various components of the adjustable guide system 130. For example, the controller 190 may determine a particular positioning of each of the shuttles 134 on their respective guide rails 132 that will result in a particular positioning of the powder distributor 140 to distribute powder in accordance with the build instructions. Once such modifications have been determined, the process moves to block 1012.

At block 1012, the controller 190 generates movement instructions. That is, the controller 190 generates instructions for directing various components of the adjustable guide system 130 to move in a manner that will cause the powder distributor 140 to move in a manner that is consistent with the build instructions received at block 1002, accounting for any modifications that may exist, as explained above. These instructions may then be transmitted to the various components of the adjustable guide system 130 at block 1014. That is, the controller 190 may cause the instructions to be sent out via the actuator interface hardware 414, the drive assembly interface hardware 418, and/or the like to each of the drive assemblies 139a-139d and/or the one or more rake angle actuators 420.

At block 1016, a determination is made as to whether additional movement is necessary. For example, such a determination may be in the affirmative if a successive layer of material is to be deposited. If additional movement is necessary, the process may return to block 1004. If no additional movement is necessary, the process may end.

It should now be understood that that the devices, systems, and methods described herein allow for a customized movement of a rake portion of a powder distributor in an additive manufacturing system. The adjustable guide systems described herein generally include four vertically disposed guide rails disposed within the build chamber, each linear guide rail allowing movement of a shuttle along the length of the guide rail. The shuttles are coupled to two rake support structures via link arms at pivot points such that movement of the shuttles along the lengths of the guide rails cause a particular movement of the rake support structures. A rake is disposed between the rake support structures and includes a plurality of rake teeth for contacting and spreading material. The guide rails and the shuttles of the adjustable guide systems can be located above or below a build platform.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

An adjustable guide system, comprising: a first arm support coupled to a first end of a powder distributor in an additive manufacturing system; a second arm support coupled to a second end of the powder distributor opposite the first end; a plurality of shuttles, each one of the plurality of shuttles pivotally coupled to the first arm support or the second arm support via one or more link arms; and a plurality of guide rails, each one of the plurality of guide rails supporting a corresponding one of the plurality of shuttles thereon and allowing each shuttle to move along the respective guide rail.

The adjustable guide system of any preceding clause, further comprising: a plurality of drive assemblies, each one of the plurality of drive assemblies driving movement of a corresponding one of the plurality of shuttles along the respective guide rail.

The adjustable guide system of any preceding clause, further comprising: a controller communicatively coupled to the plurality of drive assemblies, the controller directing movement of the plurality of drive assemblies.

The adjustable guide system of any preceding clause, wherein each one of the plurality of shuttles is coupled to the one or more link arms at a pivot point.

The adjustable guide system of any preceding clause, wherein the first arm support and the second arm support are each coupled to the one or more link arms at a pivot point.

The adjustable guide system of any preceding clause, wherein the plurality of guide rails are disposed in a system vertical direction to allow for vertical movement of the plurality of shuttles.

The adjustable guide system of any preceding clause, wherein each of the plurality of guide rails have a substantially equal length.

The adjustable guide system of any preceding clause, wherein the plurality of guide rails have varying lengths.

The adjustable guide system of any preceding clause, wherein the plurality of shuttles comprises four shuttles, wherein a first shuttle is coupled to the first arm support via a first link arm, a second shuttle is coupled to the first arm support via a pair of second link arms, a third shuttle is coupled to the second arm support via a pair of third link arms, and a fourth shuttle is coupled to the second arm support via a fourth link arm.

The adjustable guide system of any preceding clause, wherein each one of the plurality of shuttles comprises a bore extending therethrough, the bore shaped and sized to receive a corresponding one of the plurality of guide rails.

An additive manufacturing system, comprising: a build platform; a powder distributor disposed adjacent to the build platform, the powder distributor comprising a first end and a second end; and an adjustable guide system comprising: a first arm support coupled to the first end of the powder distributor, a second arm support coupled to the second end of the powder distributor opposite the first end, a plurality of shuttles, each one of the plurality of shuttles pivotally coupled to the first arm support or the second arm support via one or more link arms, and a plurality of guide rails, each one of the plurality of guide rails supporting a corresponding one of the plurality of shuttles thereon and allowing each shuttle to move along the respective guide rail.

The additive manufacturing system of any preceding clause, wherein the plurality of shuttles and the plurality of guide rails are disposed above the build platform in a system vertical direction.

The additive manufacturing system of any preceding clause, wherein the plurality of shuttles and the plurality of guide rails are disposed below the build platform in a system vertical direction.

The additive manufacturing system of any preceding clause, wherein the build platform is a movable build platform that is movable in the system vertical direction.

The additive manufacturing system of any preceding clause, wherein the powder distributor further comprises: an arm extending between the first end and the second end, the arm having a bottom surface that faces the build platform; and one or more teeth extending from the bottom surface of the arm.

The additive manufacturing system of any preceding clause, wherein the adjustable guide system further comprises: a plurality of drive assemblies, each one of the plurality of drive assemblies driving movement of a corresponding one of the plurality of shuttles along the respective guide rail.

The additive manufacturing system of any preceding clause, wherein the adjustable guide system further comprises: a controller communicatively coupled to the plurality of drive assemblies, the controller directing movement of the plurality of drive assemblies.

The additive manufacturing system of any preceding clause, wherein the plurality of guide rails are disposed in a system vertical direction to allow for vertical movement of the plurality of shuttles that translates, via the one or more link arms, to movement of the powder distributor relative to the build platform.

An additive manufacturing system, comprising: a build platform; a powder distributor disposed adjacent to the build platform, the powder distributor comprising an arm having a first end and a second end; an adjustable guide system comprising: a first arm support coupled to the first end of the arm of the powder distributor, a second arm support coupled to the second end of the arm of the powder distributor opposite the first end, a plurality of shuttles, each one of the plurality of shuttles pivotally coupled to the first arm support or the second arm support via one or more link arms, a plurality of guide rails, each one of the plurality of guide rails supporting a corresponding one of the plurality of shuttles thereon and allowing each shuttle to move along the respective guide rail, a plurality of drive assemblies, each one of the plurality of drive assemblies driving movement of a corresponding one of the plurality of shuttles along the respective guide rail, and a controller communicatively coupled to the plurality of drive assemblies, the controller directing movement of the plurality of drive assemblies.

The additive manufacturing system of any preceding clause, wherein: the plurality of shuttles and the plurality of guide rails are disposed below the build platform in a system vertical direction; and the build platform is a movable build platform that is movable in the system vertical direction.

What is claimed is:

1. An additive manufacturing system, comprising:
    a build platform;
    a powder distributor disposed adjacent to the build platform, the powder distributor comprising a first end and a second end, wherein the powder distributor comprises:
        an arm extending between the first end and the second end, the arm having a bottom surface that faces the build platform;
        one or more teeth extending from the bottom surface of the arm; and
    an adjustable guide system comprising:
        a first arm support coupled to the first end of the powder distributor, a second arm support coupled to the second end of the powder distributor opposite the first end, a plurality of shuttles, each one of the plurality of shuttles pivotally coupled to the first arm support or the second arm support via one or more link arms, and
        a plurality of guide rails, each one of the plurality of guide rails supporting a corresponding one of the plurality of shuttles thereon and allowing each shuttle to move along the respective guide rail.

2. The additive manufacturing system of claim 1, wherein each one of the plurality of shuttles is coupled to the one or more link arms at a pivot point.

3. The additive manufacturing system of claim 1, wherein the first arm support and the second arm support are each coupled to the one or more link arms at a pivot point.

4. The additive manufacturing system of claim 1, wherein each of the plurality of guide rails have a substantially equal length.

5. The additive manufacturing system of claim 1, wherein the plurality of guide rails have varying lengths.

6. The additive manufacturing system of claim 1, wherein the plurality of shuttles comprises four shuttles, wherein a first shuttle is coupled to the first arm support via a first link arm, a second shuttle is coupled to the first arm support via a pair of second link arms, a third shuttle is coupled to the second arm support via a pair of third link arms, and a fourth shuttle is coupled to the second arm support via a fourth link arm.

7. The additive manufacturing system of claim 1, wherein each one of the plurality of shuttles comprises a bore extending therethrough, the bore shaped and sized to receive a corresponding one of the plurality of guide rails.

8. The additive manufacturing system of claim 1, wherein the plurality of shuttles and the plurality of guide rails are disposed above the build platform in a system vertical direction.

9. The additive manufacturing system of claim 1, wherein the plurality of shuttles and the plurality of guide rails are disposed below the build platform in a system vertical direction.

10. The additive manufacturing system of claim 9, wherein the build platform is a movable build platform that is movable in the system vertical direction.

11. The additive manufacturing system of claim 1, wherein the adjustable guide system further comprises:
    a plurality of drive assemblies, each one of the plurality of drive assemblies driving movement of a corresponding one of the plurality of shuttles along the respective guide rail.

12. The additive manufacturing system of claim 11, wherein the adjustable guide system further comprises:
    a controller communicatively coupled to the plurality of drive assemblies, the controller directing movement of the plurality of drive assemblies.

13. The additive manufacturing system of claim 1, wherein the plurality of guide rails are disposed in a system vertical direction to allow for vertical movement of the plurality of shuttles that translates, via the one or more link arms, to movement of the powder distributor relative to the build platform.

14. An additive manufacturing system, comprising:
    a build platform;
    a powder distributor disposed adjacent to the build platform, the powder distributor comprising an arm having a first end and a second end, wherein the powder distributor comprises:
        an arm extending between the first end and the second end, the arm having a bottom surface that faces the build platform; and
        one or more teeth extending from the bottom surface of the arm;
    an adjustable guide system comprising:
        a first arm support coupled to the first end of the arm of the powder distributor, a second arm support coupled to the second end of the arm of the powder distributor opposite the first end, a plurality of shuttles, each one of the plurality of shuttles pivotally coupled to the first arm support or the second arm support via one or more link arms, a plurality of guide rails, each one of the plurality of guide rails supporting a corresponding one of the plurality of shuttles thereon and allowing each shuttle to move along the respective guide rail, a plurality of drive assemblies, each one of the plurality of drive assemblies driving movement of a corresponding one of the plurality of shuttles along the respective guide rail, and
        a controller communicatively coupled to the plurality of drive assemblies, the controller directing movement of the plurality of drive assemblies.

15. The additive manufacturing system of claim 14, wherein:
    the plurality of shuttles and the plurality of guide rails are disposed below the build platform in a system vertical direction; and
    the build platform is a movable build platform that is movable in the system vertical direction.

* * * * *